(12) United States Patent  
Lee et al.

(10) Patent No.: US 9,383,904 B2  
(45) Date of Patent: Jul. 5, 2016

(54) MOBILE TERMINAL AND METHOD FOR CONTROLLING THE SAME

(71) Applicant: LG ELECTRONICS INC., Seoul (KR)

(72) Inventors: Jieun Lee, Seoul (KR); Sungchae Na, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 333 days.

(21) Appl. No.: 14/049,305

(22) Filed: Oct. 9, 2013

(65) Prior Publication Data

US 2014/0123042 A1 May 1, 2014

(30) Foreign Application Priority Data

Oct. 31, 2012 (KR) ........................ 10-2012-0122058

(51) Int. Cl.
*G06F 3/0484* (2013.01)
*G06F 3/0488* (2013.01)

(52) U.S. Cl.
CPC ............ *G06F 3/0484* (2013.01); *G06F 3/0488* (2013.01); *G06F 3/04883* (2013.01)

(58) Field of Classification Search
None
See application file for complete search history.

(56) References Cited

U.S. PATENT DOCUMENTS

| | | | | |
|---|---|---|---|---|
| 5,748,780 A | * | 5/1998 | Stolfo | G06F 17/30256 382/232 |
| 6,115,037 A | * | 9/2000 | Sumiyoshi | G11B 27/034 715/726 |
| 6,310,623 B1 | * | 10/2001 | Zhang | G06T 7/0012 345/442 |
| 6,784,886 B1 | * | 8/2004 | Cailloux | G06T 11/306 345/440 |
| 2002/0085754 A1 | * | 7/2002 | Schoepflin | G06T 7/0083 382/173 |
| 2005/0281474 A1 | * | 12/2005 | Huang | H04N 1/642 382/239 |
| 2007/0262985 A1 | * | 11/2007 | Watanabe | H04N 13/0018 345/420 |
| 2008/0002910 A1 | * | 1/2008 | Ojima | G06T 15/00 382/277 |
| 2009/0070820 A1 | * | 3/2009 | Li | G06Q 20/12 725/62 |
| 2009/0303199 A1 | * | 12/2009 | Cho | G06F 3/04883 345/173 |

* cited by examiner

*Primary Examiner* — Phenuel Salomon

(74) *Attorney, Agent, or Firm* — Ked & Associates, LLP

(57) ABSTRACT

A mobile terminal and a method of controlling the mobile terminal are provided. The mobile terminal may generate and display a plurality of objects each having a specific contour, on a touch screen, and may display a bar for controlling an undo function on at least some section of the contour of one or more of the plurality of objects displayed on the touch screen. Accordingly, the contour of one or more of the displayed objects may be edited more conveniently.

15 Claims, 29 Drawing Sheets

Fig. 23
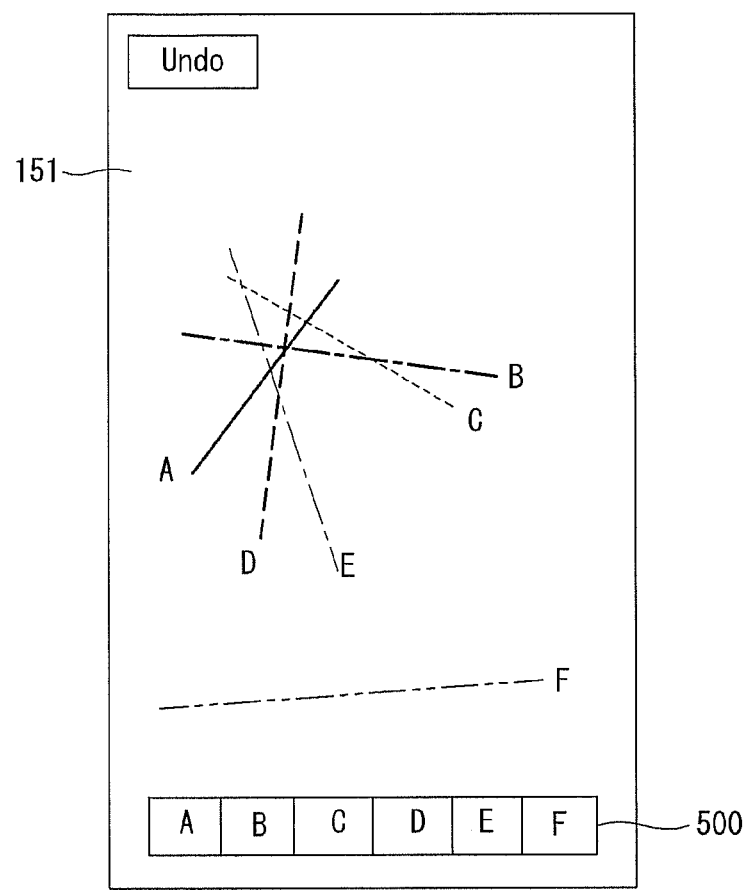
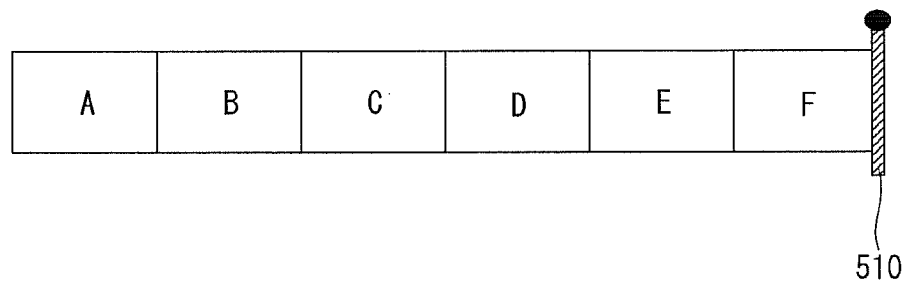

Fig. 24
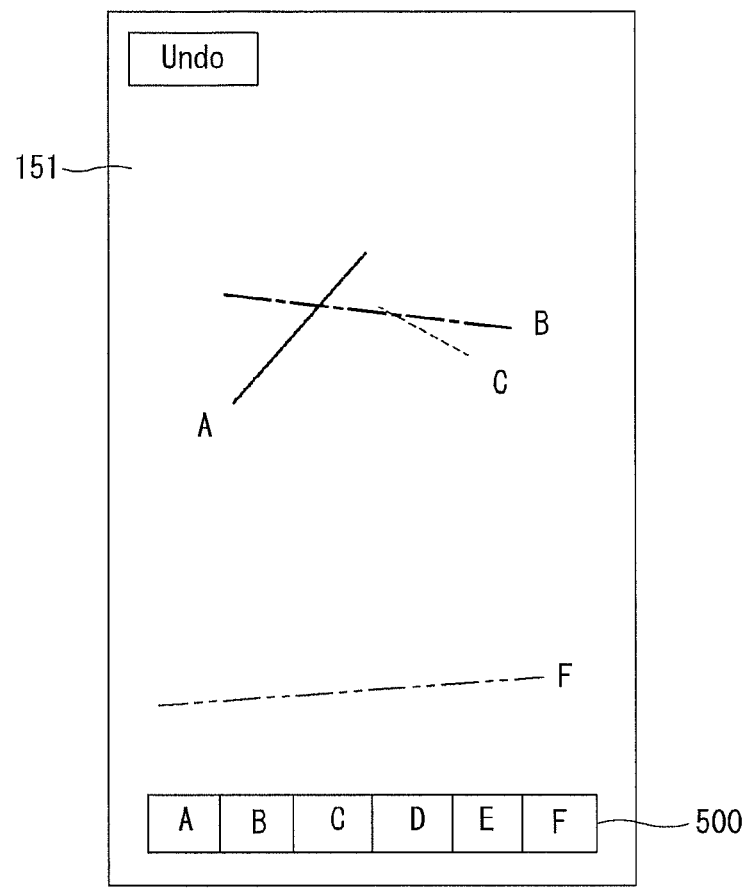
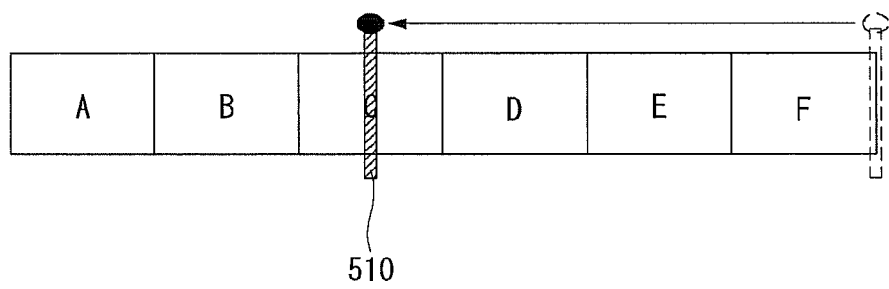

Fig. 25
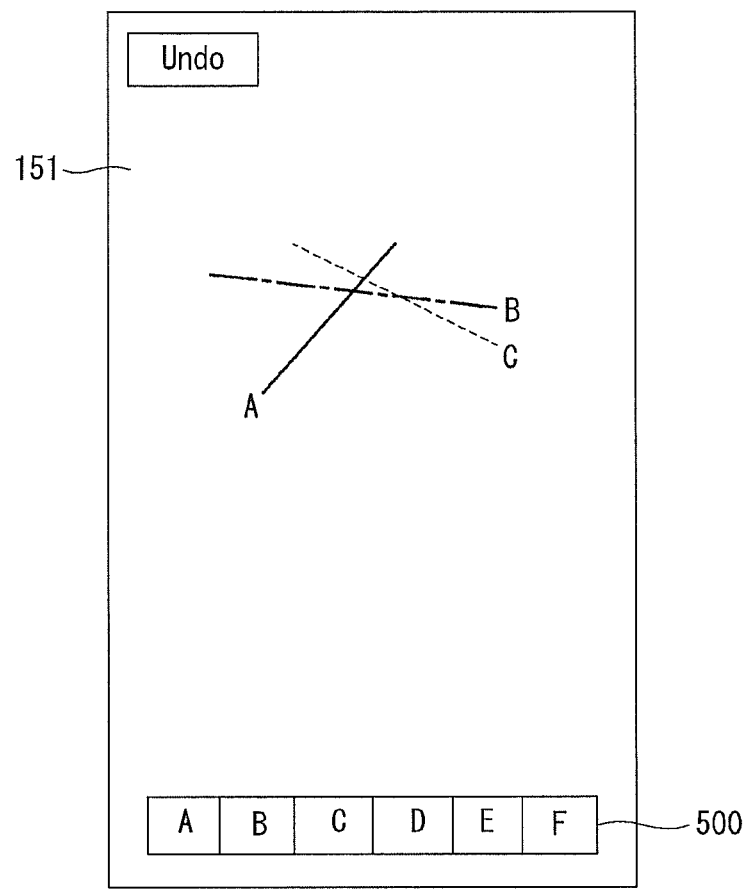
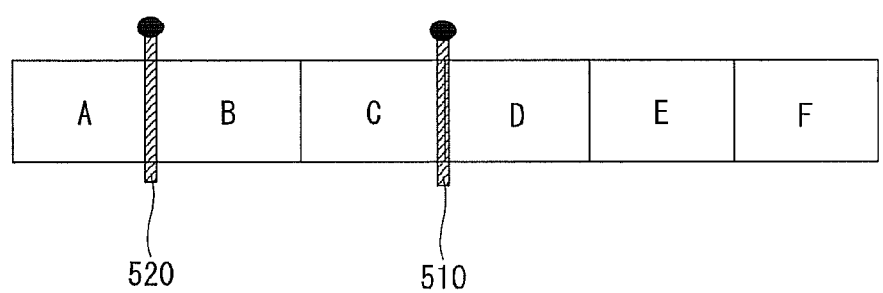

Fig. 26
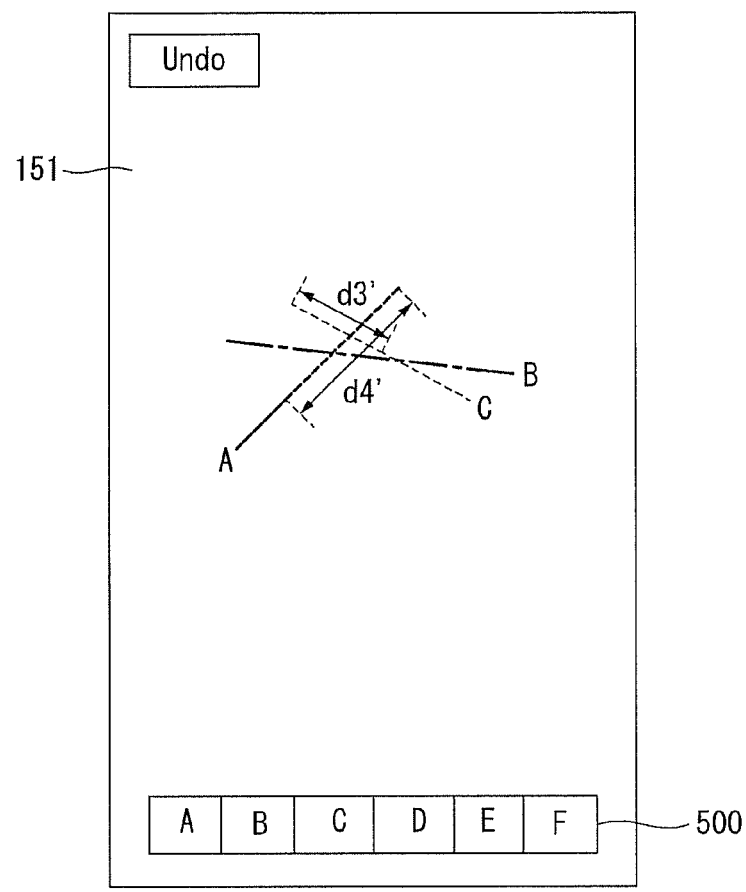
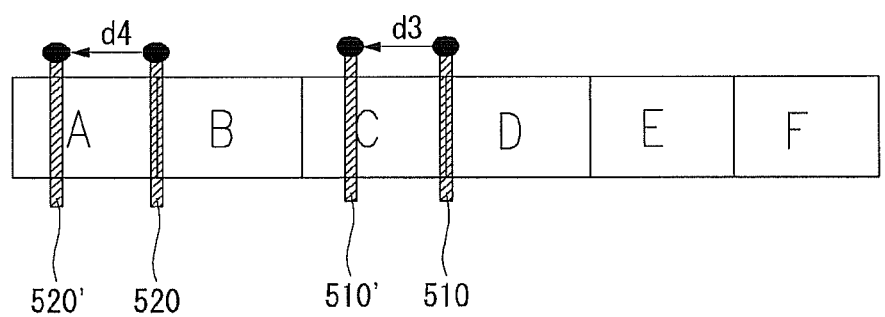

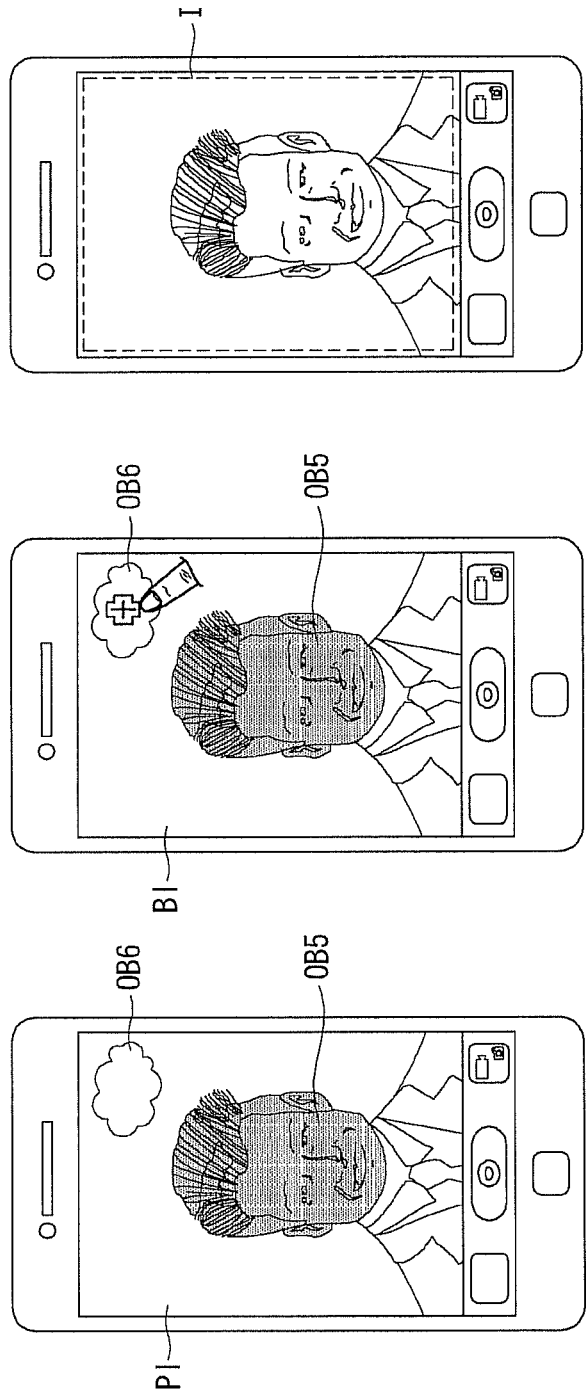

MOBILE TERMINAL AND METHOD FOR CONTROLLING THE SAME

CROSS-REFERENCE TO RELATED APPLICATION(S)

This application claims priority under 35 U.S.C. §119 to Korean Application No. 10-2012-0122058 filed on Oct. 31, 2012, whose entire disclosure is hereby incorporated by reference.

BACKGROUND

1. Field

This relates to a mobile terminal and a method of controlling the same.

2. Background

With the rapid development of hardware technology and software technology related to various types of electronic devices including mobile terminals, electronic devices may provide and/or store various types of functions and pieces of information.

A mobile terminal equipped with a touch screen may access various pieces of information through a touch manipulation. In certain systems handwriting may also be input through a touch screen.

BRIEF DESCRIPTION OF THE DRAWINGS

The embodiments will be described in detail with reference to the following drawings in which like reference numerals refer to like elements wherein:

FIGS. 19 to 26 illustrate the method of controlling the mobile terminal shown in FIG. 18, in accordance with embodiments as broadly described herein;

FIGS. 28 to 29 illustrate the method of controlling the mobile terminal in accordance with the embodiment shown in FIG. 27.

DETAILED DESCRIPTION

Figure 1:
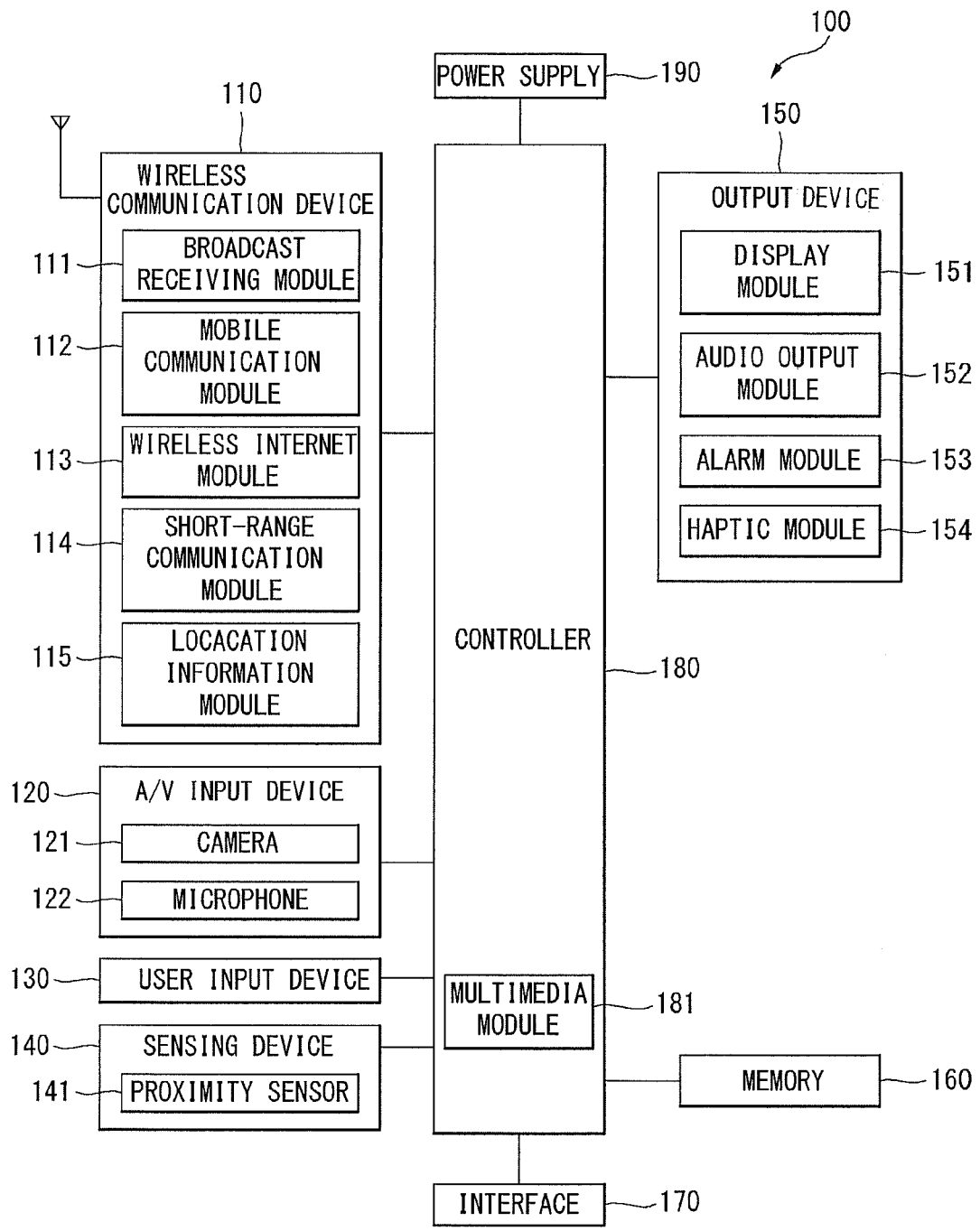
FIG. 1 is a block diagram of a mobile terminal in accordance with an embodiment as broadly described herein.

Various objects, characteristics, and advantages of the exemplary embodiments will become more apparent from the following detailed description taken in conjunction with the accompanying drawings. Some exemplary embodiments are described in detail below with reference to the accompanying drawings. The same reference numerals designate the same elements throughout the drawings.

A mobile terminal in accordance with embodiments will be described in more detail below with reference to the accompanying drawings. It is to be noted that the suffixes of the elements used in the following description, such as 'module' and 'unit,' are assigned or mixed in use simply for ease of discussion/explanation, but in themselves are not particularly given importance and roles.

The mobile terminal described in this specification may include a mobile phone, a smart phone, a notebook computer, a terminal for digital broadcast, a Personal Digital Assistant (PDA), a Portable Multimedia Player (PMP), a navigator, to a name few.

As shown in FIG. 1, the mobile terminal 100 may include a wireless communication device 110, an A/V (Audio/Video) input device 120, a user input device 130, a sensing device 140, an output device 150, a memory 160, an interface 170, a controller 180, and a power supply 190, etc. FIG. 1 shows the mobile terminal 100 including various components, but implementing all of the illustrated components is not a requirement. Greater or fewer components may alternatively be implemented.

The wireless communication device 110 may include one or more components allowing radio communication between the mobile terminal 100 and a wireless communication system or a network in which the mobile terminal 100 is located. For example, in FIG. 1, the wireless communication device 110 may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. The broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and, in this instance, the broadcast associated information may be received by the mobile communication module 112. The broadcast signal may exist in various forms. For example, the broadcast signal may exist in the form of an electronic program guide (EPG) of the digital multimedia broadcasting (DMB) system, and electronic service guide (ESG) of the digital video broadcast-handheld (DVB-H) system, and the like.

The broadcast receiving module 111 may also be configured to receive signals broadcast by using various types of broadcast systems. In particular, the broadcast receiving module 111 may receive a digital broadcast using a digital broadcast system, such as the multimedia broadcasting-terrestrial (DMB-T) system, the digital multimedia broadcasting-satellite (DMB-S) system, the digital video broadcast-handheld (DVB-H) system, and the integrated services digital broadcast-terrestrial (ISDB-T) system. The broadcast receiving module 111 may also be configured to be suitable for all broadcast systems that provide a broadcast signal as well as the above-mentioned digital broadcast systems.

The broadcast signals and/or broadcast-associated information received via the broadcast receiving module 111 may be stored in the memory 160.

The mobile communication module 112 may transmit and/or receive radio signals to and/or from at least one of a base station, an external terminal and/or a server. Such radio signals may include a voice call signal, a video call signal or various types of data according to text and/or multimedia message transmission and/or reception.

The wireless Internet module 113 may support wireless Internet access for the mobile terminal and may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 may support short range communications. Some examples of short-range communication technology include Bluetooth™, Radio Frequency IDentification (RFID), Infrared Data Association (IrDA), Ultra-WideBand (UWB), ZigBee™, and the like.

The location information module 115 may check and/or acquire a location or position of the mobile terminal 110. The location information module 115 may acquire location information by using a global navigation satellite system (GNSS). Such a GPS module 115 may calculate information related to the distance from one point (entity) to three or more satellites and information related to time at which the distance information was measured, and applies trigonometry to the calculated distance, thereby calculating three-dimensional location information according to latitude, longitude, and altitude with respect to the one point (entity). In addition, a method of acquiring location and time information by using three satellites and correcting an error of the calculated location and time information by using another one satellite may be also used. The GPS module 115 may also continuously calculate the current location in real time and also calculate speed information by using the continuously calculated current location.

Referring to FIG. 1, the A/V input device 120 may receive an audio or video signal, and may include a camera 121 and a microphone 122. The camera 121 processes image data of still pictures or video obtained by an image capture device in a video capturing mode or an image capturing mode, and the processed image frames may then be displayed on a display 151. The image frames processed by the camera 121 may be stored in the memory 160 or transmitted via the wireless communication device 110. Two or more cameras 121 may also be provided according to the configuration of the mobile terminal 100.

The microphone 122 may receive sounds in a phone call mode, a recording mode, a voice recognition mode, and the like, and may process such sounds into audio data. The processed audio data may then be converted for output into a format transmittable to a mobile communication base station via the mobile communication module 112 for the phone call mode. The microphone 122 may also implement various types of noise canceling (or suppression) algorithms to cancel or suppress noise or interference generated when receiving and transmitting audio signals.

The user input unit 130 may generate input data from commands entered by a user to control various operations of the mobile terminal. The user input unit 130 may include a keypad, a dome switch, a touch pad (e.g., electrostatic/static pressure), a jog wheel, a jog switch, and the like.

The sensing device 140 may detect a current status of the mobile terminal 100 such as an opened or closed state of the mobile terminal 100, a location of the mobile terminal 100, the presence or absence of user contact with the mobile terminal 100, the orientation of the mobile terminal 100, an acceleration or deceleration movement and direction of the mobile terminal 100, etc., and may generate commands or signals for controlling the operation of the mobile terminal 100. For example, when the mobile terminal 100 is implemented as a slide type mobile phone, the sensing device 140 may sense whether the slide phone is opened or closed. The sensing device 140 may detect whether or not the power supply 190 supplies power or whether or not the interface 170 is coupled with an external device. In FIG. 1, the sensing device 140 may also include a proximity sensor 141.

The output device 150 may provide outputs in a visual, audible, and/or tactile manner. In the example in shown FIG. 1, the output device 150 may include the display module 151, an audio output module 152, an alarm module 153, and a haptic module 154.

The display module 151 may display information processed in the mobile terminal 100. For example, when the mobile terminal 100 is in a phone call mode, the display module 151 may display a User Interface (UI) or a Graphic User Interface (GUI) associated with a call or other communication. If the mobile terminal 100 is in a video call mode or a photographing mode, the mobile terminal 100 displays a photographed or/and received image or a UI or a GUI.

The display module 151 may also include at least one of a Liquid Crystal Display (LCD), a Thin Film Transistor-LCD (TFT-LCD), an Organic Light Emitting Diode (OLED) display, a flexible display, a three-dimensional (3D) display, or the like.

Some of these displays may also be configured to be transparent or light-transmissive to allow for viewing therethrough, referred to as transparent displays. An example of a transparent display is a TOLED (Transparent Organic Light Emitting Diode) display, or the like. A rear structure of the display module 151 may be also light-transmissive. Through such configuration, the user may view an object positioned at the rear side of the terminal body through the region occupied by the display module 151 of the terminal body.

The mobile terminal 100 may include two or more display modules 151 depending on its particular desired embodiment. For example, a plurality of display modules 151 may be separately or integrally disposed on one surface of the mobile terminal 100, or may be separately disposed on mutually different surfaces.

If the display module 151 and a sensor (referred to as a 'touch sensor', hereinafter) for detecting a touch operation are arranged in a layered manner to form a touch screen, the display module 151 may function as both an input device and an output device. The touch sensor may have a form of a touch film, a touch sheet, or a touch pad.

The touch sensor may be configured to convert pressure applied to a particular portion of the display module 151 or a change in the capacitance or the like generated at a particular portion of the display module 151 into an electrical input signal. The touch sensor may also be configured to detect pressure when a touch is applied, as well as the touched position and area.

When there is a touch input with respect to the touch sensor, corresponding signals are transmitted to a touch controller, and the touch controller processes the signals and transmits corresponding data to the controller 180. Accordingly, the controller 180 may recognize which portion of the display module 151 has been touched.

Referring to FIG. 1, the proximity sensor 141 may be disposed within or near the touch screen. The proximity sensor 141 may detect the presence or absence of an object relative to a certain detection surface or an object that exists nearby by using the force of electromagnetism or infrared rays without physical contact. Thus, the proximity sensor 141 may have a considerably longer life span compared with a contact type sensor, and may be utilized for various purposes.

Examples of the proximity sensor 141 may include a transmission type photoelectric sensor, a direct reflection type photoelectric sensor, a mirror-reflection type photo sensor, an RF oscillation type proximity sensor, a capacitance type proximity sensor, a magnetic proximity sensor, and an infrared proximity sensor. If the touch screen is the capacitance type, proximity of the pointer may be detected by a change in electric field according to the proximity of the pointer. In this instance, the touch screen (touch sensor) may be considered a proximity sensor.

In the following description, for the sake of brevity, recognition of the pointer positioned to be close to the touch screen will be called a 'proximity touch', while recognition of actual contact of the pointer on the touch screen will be called a 'contact touch'. Further, when the pointer is in the state of the proximity touch, the pointer may be considered to be positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) may be detected, and information corresponding to the detected proximity touch operation and the proximity touch pattern may be output to the touch screen.

The audio output module 152 may convert and output audio data received from the wireless communication device 110 or stored in the memory 160 in a call signal reception mode, a call mode, a record mode, a voice recognition mode, a broadcast reception mode, and the like. The audio output module 152 may provide audible outputs related to a particular function performed by the mobile terminal 100 (e.g., a call signal reception sound, a message reception sound, etc.). The audio output module 152 may also include a speaker, a buzzer, or the like. The audio output module 152 may also output sound through an earphone jack.

The alarm module 153 may output information indicating the occurrence of an event of the mobile terminal 100. Typical events may include call reception, message reception, key signal inputs, a touch input etc. In addition to audio or video outputs, the alarm module 153 may provide outputs in a different manner to indicate the occurrence of an event. For example, the alarm module 153 may provide an output in the form of vibrations. The video signal or the audio signal may be also output through the display module 151 or the audio output module 152.

The haptic module 154 may generate various tactile effects the user may feel. One example of the tactile effects generated by the haptic module 154 is vibration. The strength and pattern of the haptic module 154 may also be controlled. For example, different vibrations may be combined to be output or sequentially output.

Besides vibration, the haptic module 154 may generate various other tactile effects such as stimulation effected by a pin arrangement vertically moving with respect to contact with skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may also allow the user to feel a tactile effect through a muscle sensation such as fingers or arm of the user, as well as transferring the tactile effect through direct contact. Two or more haptic modules 154 may be provided according to the configuration of the mobile terminal 100.

The memory 160 may store software programs used for the processing and controlling operations performed by the controller 180, or temporarily store data (e.g., a phonebook, messages, still images, video, etc.) that are input and/or output. The memory 160 may store data regarding various patterns of vibrations and audio signals output when a touch is input to the touch screen.

The memory 160 may also include at least one type of storage medium including a flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. The mobile terminal 100 may be operated in relation to a web storage device that performs the storage function of the memory 160 over the Internet.

The interface 170 may provide an interface with external devices connected with the mobile terminal 100 to exchange data with an external device, receive and transmit power to each element of the mobile terminal 100, or transmit internal data of the mobile terminal 100 to an external device. For example, the interface 170 may include wired or wireless headset ports, external power supply ports, wired or wireless data ports, memory card ports, ports for connecting a device having an identification module, audio input/output (I/O) ports, video I/O ports, earphone ports, or the like.

The identification module may also be a chip that stores various types of information for authenticating the authority of using the mobile terminal 100 and may include a user identity module (UIM), a subscriber identity module (SIM) a universal subscriber identity module (USIM), and the like. The device having the identification module (referred to as an 'identifying device', hereinafter) may take the form of a smart card. Accordingly, the identifying device can be connected with the mobile terminal 100 via a port.

When the mobile terminal 100 is connected with an external cradle, the interface 170 may also serve as a passage to allow power from the cradle to be supplied therethrough to the mobile terminal 100 or serve as a passage to allow various command signals input by the user from the cradle to be transferred to the mobile terminal 100 therethrough. Various command signals or power input from the cradle may operate as signals for recognizing that the mobile terminal is properly mounted on the cradle.

The controller 180 may control the general operation of the mobile terminal 100. For example, the controller 180 performs controlling and processing associated with voice calls, data communications, video calls, and the like. In the example shown in FIG. 1, the controller 180 also includes a multimedia module 181 for reproducing multimedia data. The multimedia module 181 may be configured within the controller 180 or may separate from the controller 180.

The controller 180 may also perform pattern recognition processing to recognize a handwriting input or a picture drawing input performed on the touch screen as characters or images, respectively.

The power supply 190 may receive external power or internal power and supply appropriate power required for operating respective elements and components under the control of the controller 180.

Further, various embodiments described herein may be implemented in a computer-readable or its similar medium using, for example, software, hardware, or any combination thereof.

For a hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For a software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

In the embodiments as broadly described herein, it is assumed that the display module 151 is a touch screen 151, for convenience of description. As described above, the touch screen 151 may perform both an information display function and an information input function. It is, however, to be noted that the touch screen 151 is not limited to the information display function and the information input function. Furthermore, a touch as broadly described herein may include both a contact touch and a proximity touch.

Figure 2:
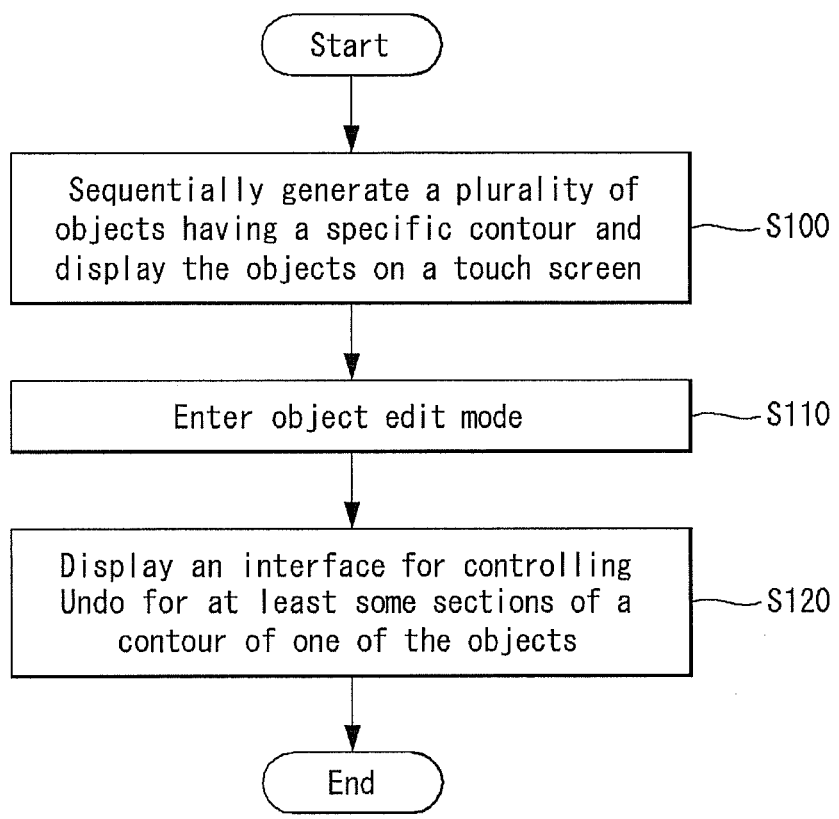
FIG. 2 is a flowchart of a method of controlling the mobile terminal in accordance with an embodiment as broadly described herein.

FIG. 2 is a flowchart of a method of controlling the mobile terminal shown in FIG. 1, and FIGS. 3 to 5 are diagrams illustrating the method shown in FIG. 2. The control method may be implemented under the control of the controller 180 of the mobile terminal 100 described above.

Referring to FIG. 2, the controller 180 of the mobile terminal 100 may sequentially generate a plurality of objects having a specific contour and display the plurality of objects on the touch screen 151 at step S100.

In one embodiment, the contour may be an outline forming an independent and specific object. In another embodiment, the specific object may be, for example, a set of contours drawn in response to a user's handwriting input through the touch screen 151. In certain embodiments, the specific object may include an object inputted through a soft key of the mobile terminal 100 using a specific application.

The plurality of objects may be sequentially generated. For example, after a first object is generated in response to a user's hand handwriting input, a second object may be generated. After the second object is generated, a third object may be generated. The first object, the second object, and the third object may have a region in which at least some of the first object, the second object, and the third object overlap with each other. Furthermore, the first object, the second object, or the third object may have a region in which two or more of the first object, the second object, and the third object overlap with each other.

The controller 180 may display an identifier for identifying an order in which the plurality of objects were sequentially generated.

The controller 180 may enable an edit mode in which at least one of the plurality of generated objects may be edited at step S110. In one embodiment, this may include an undo function for the contour that forms a particular object. Accordingly, when the contour forming a first object is inputted to the touch screen 151 through a user's hand handwriting input, the controller 180 may monitor information related to the path of the contour in real time and store the information in the memory 160.

The edit mode may also include a redo function for a contour to which the undo function has previously been applied. These exemplary functions of the edit mode are provided to illustrate embodiments, but are not limited thereto. For example, if the object is an image captured by a camera, the edit mode may include various types of functions for assigning various effects to the image. In this case, a method of controlling the mobile terminal in accordance with an embodiment as broadly described herein may also be applied to the undo function and/or the redo function for the image effects.

The controller 180 display a user interface, for controlling the undo function on at least some section of a contour that forms a specific object of the plurality of objects, on the touch screen 151 at step S120. The interface may have, for example, a bar shape or other shape as appropriate for the terminal 100, the touch screen 151, and the object(s) displayed.

An example in which the undo function is executed on at least some section of the contour forming a specific object through the user interface is described in more detail below with reference to FIGS. 3 to 5.

Figure 3:
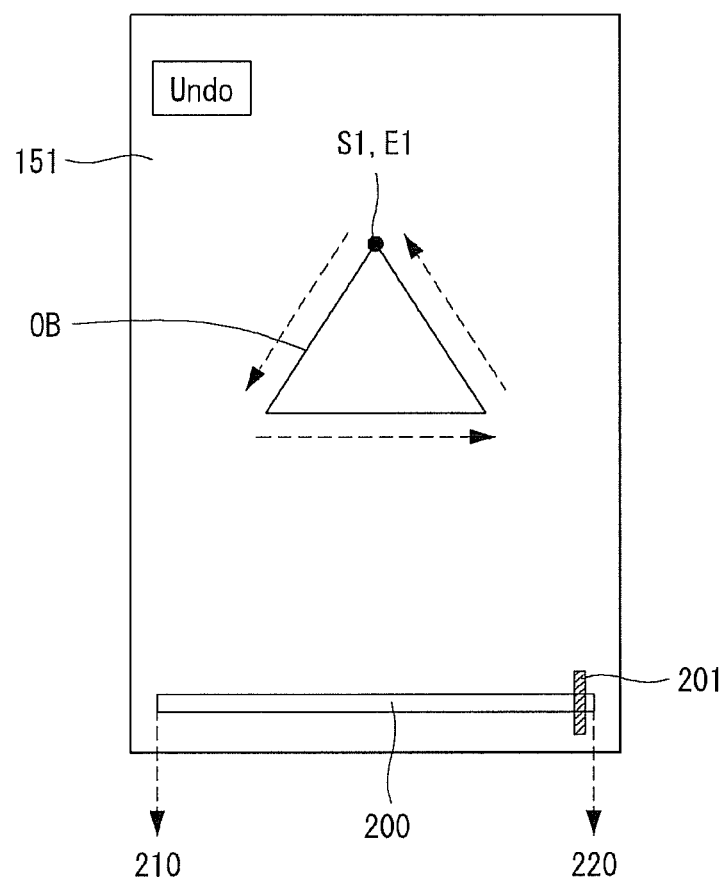
FIGS. 3 to 5 illustrate the method of controlling the mobile terminal shown in FIG. 2, in accordance with embodiments as broadly described herein.
Figure 4:
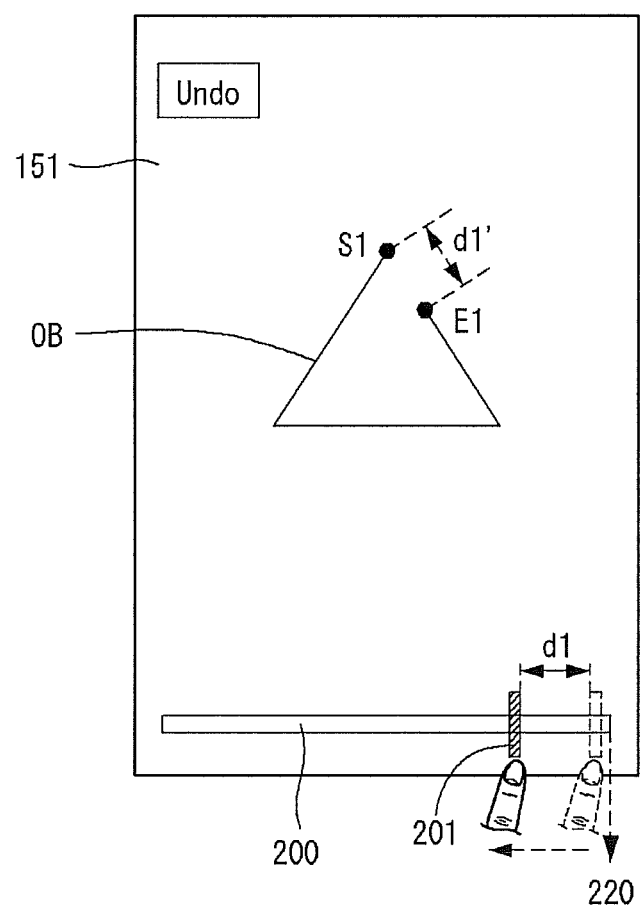

Referring to FIG. 3, the controller 180 may display an object OB drawn in response to a user's hand handwriting input on the touch screen 151. The start point S1 and the end point E1 of a contour forming the object OB may be the same, indicating the object OB is defined by a closed curve. In contrast, if the start point S1 and the end point E1 of the contour are not the same, the object OB may have a specific straight line or curve shape.

As discussed above, the contour of the object OB may be drawn on the touch screen 151 along a specific path for forming the object OB. Information related to the path of the contour drawn in the touch screen 151 may be stored in the memory 160 of the mobile terminal 100 in real time.

When entering the edit mode (e.g., executing the undo function), the controller 180 may display a bar 200 for controlling the undo function. The bar 200 may include a start point 210 and an end point 220. The start point 210 of the bar 200 corresponds to the start point S1 of the contour of the object OB, and the end point 220 of the bar 200 corresponds to the end point E1 of the contour of the object OB. The bar 200 may include a handle 201 for controlling the undo function and/or the redo function for the contour of the object OB while moving left and right along the bar 200.

When entering the edit mode, the controller 180 may display the handle 201 at the end point 220 of the bar 200. Referring to FIG. 4, when receiving a touch input causing the handle 201 move along the bar 200 in a first direction (i.e., from the end point 220 toward the start point 210), the controller 180 executes the undo function on the contour corresponding to a length which the handle 201 has moved along the bar 200. That is, when receiving a drag input moving the handle 201 to the left by d1, the controller 180 may apply the undo function to the contour of the object OB by a corresponding distance d1'.

Figure 5:
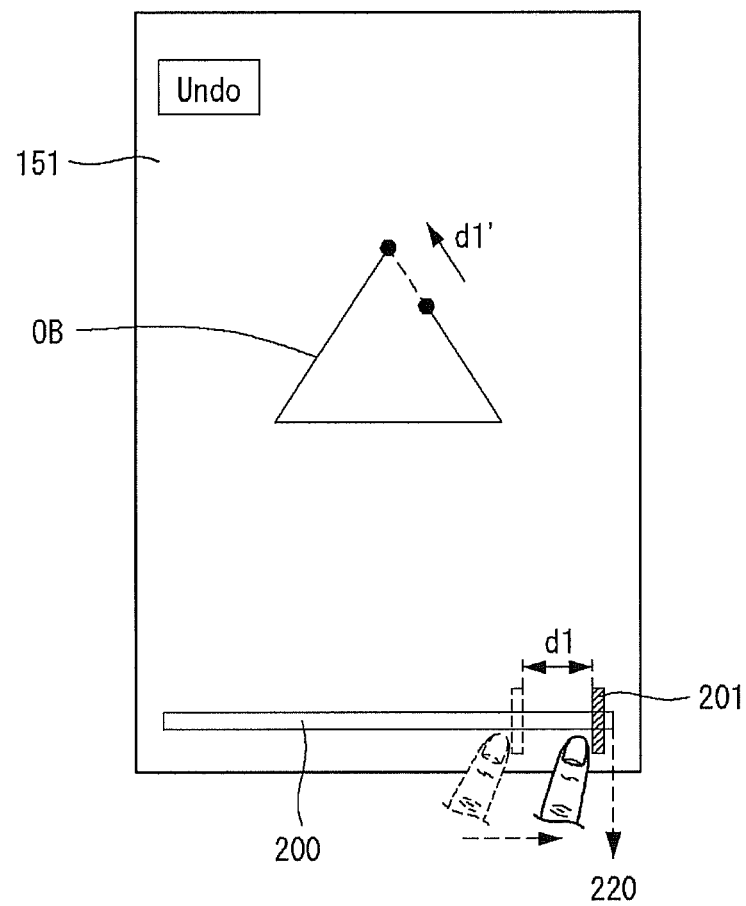

Referring to FIG. 5, after executing the undo function on a specific section of the contour, when receiving a touch input moving the handle 201 in a direction opposite to the first direction (i.e., in a direction towards the end point 220), the controller 180 may execute the redo function on the contour on which the undo function has already been executed. That is, when receiving a drag input moving the handle 201 back toward the end point 220 of the bar 200 (i.e., in the right direction), the controller 180 may insert the section of the contour, or a portion thereof depending on the distance moved along the bar 200, deleted from the object OB earlier using the undo function by applying the redo function.

Accordingly, in accordance with an embodiment as broadly described herein, the undo and redo functions may be executed on at least some section of a specific object, including a contour drawn in response to a user's hand handwriting input, through a drag input on the handle 201 of the bar 200 in an appropriate direction.

Some examples in which the undo function is executed on at least one object of a plurality of objects sequentially displayed on a display are described below.

Figure 6:
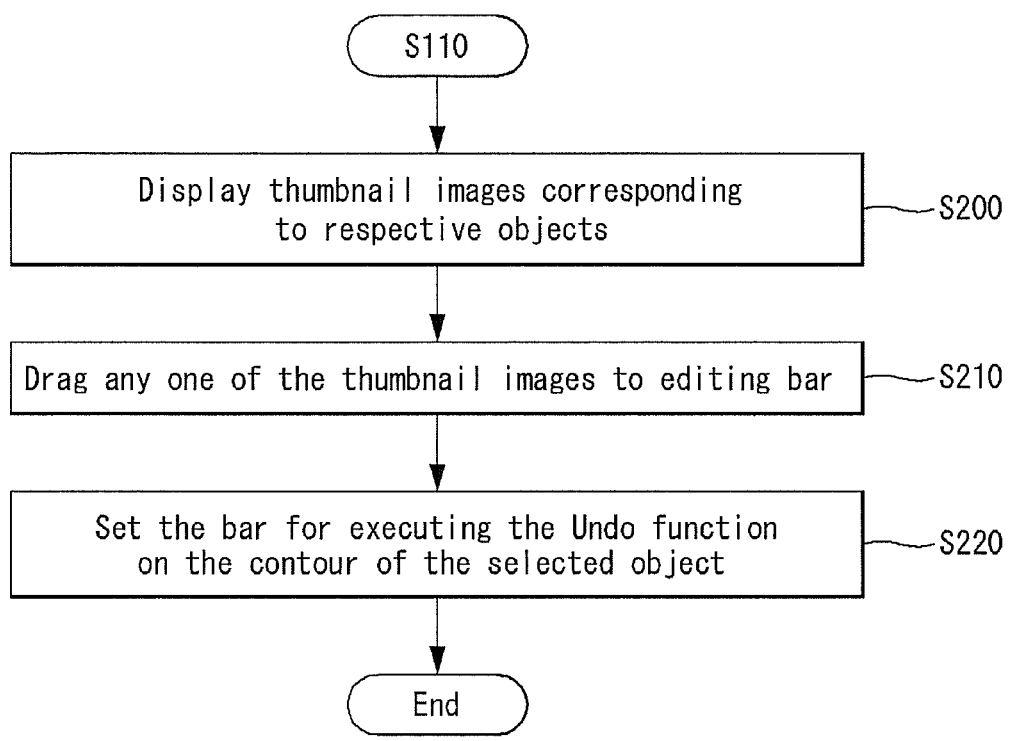
FIG. 6 is a flowchart of a method of controlling the mobile terminal in accordance with another embodiment as broadly described herein.

FIG. 6 is a flowchart of a method of controlling the mobile terminal in accordance with another embodiment, and FIGS. 7 to 11 illustrate application(s) of the method shown in FIG. 6.

Referring to FIG. 6, when entering the edit mode after sequentially generating a plurality of objects, the controller 180 may display thumbnail images, corresponding to the respective objects, on the touch screen 151 at step S200. When receiving a drag input causing any one of the thumbnail images to be moved to the bar 200 at step S210, the controller 180 may set the bar 200 for executing the undo function on the contour of the selected object at step S220.

Figure 7:
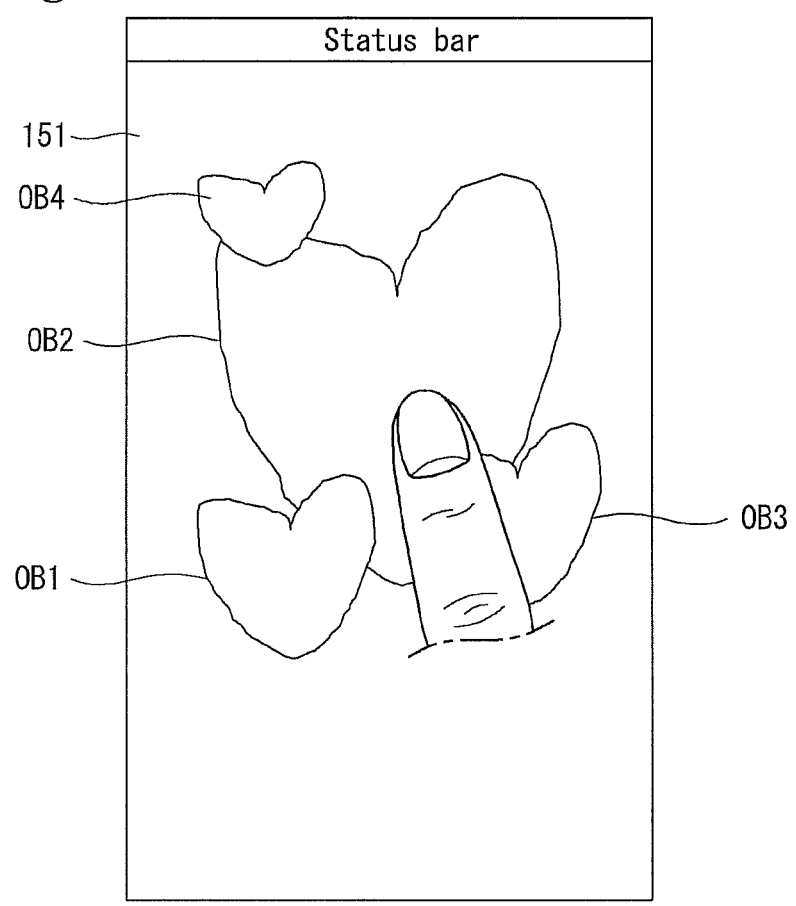
FIGS. 7 to 11 illustrate the method of controlling the mobile terminal shown in FIG. 6, in accordance with embodiments as broadly described herein.
Figure 8:
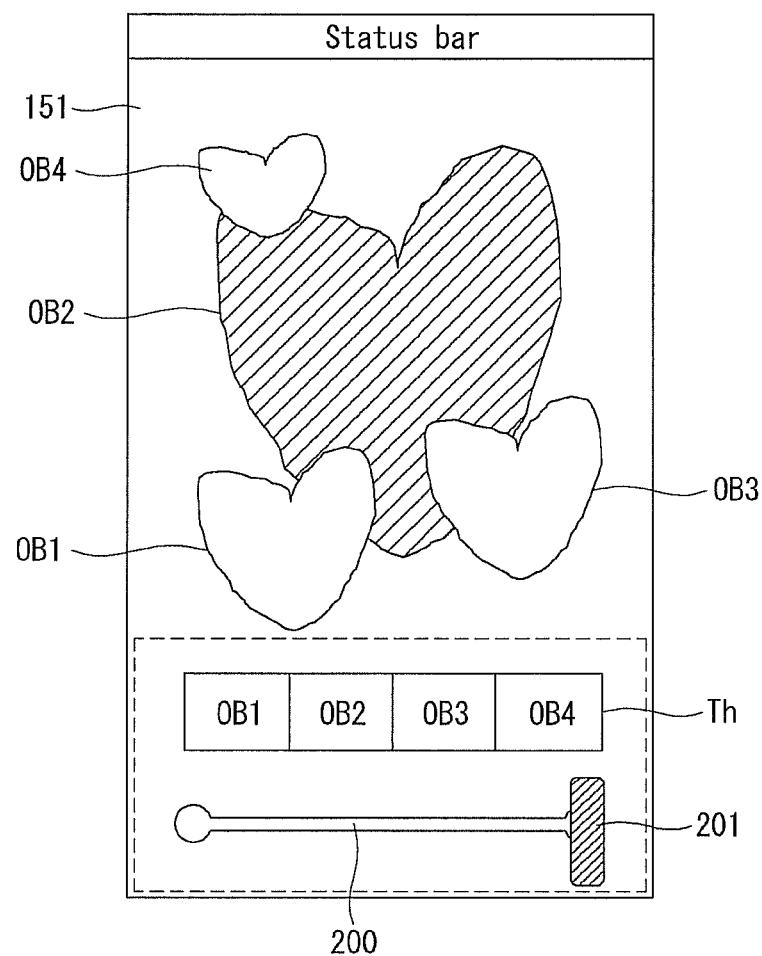

Referring to FIGS. 7 and 8, the controller 180 may display a plurality of objects OB1, OB2, OB3, and OB4 on the touch screen 151. It is assumed that the first object OB1, the second object OB2, the third object OB3, and the fourth object OB4 are sequentially generated.

If a user wants to edit the second object OB2, the user may control the mobile terminal 100 using a predetermined input to enter the edit mode. The predetermined input may include an input for selecting an undo function key corresponding to the undo function, a long touch input for the second object OB2, or other input as appropriate.

When entering the edit mode, the controller 180 may display the bar 200 and a thumbnail image group Th for the plurality of objects OB1, OB2, OB3, and OB4 on the touch screen 151. In response to a touch input at any one of the thumbnail images belonging to the thumbnail image group Th associated with the bar 200, the controller 180 may set the bar 200 to control the undo function for the contour of an object corresponding to the selected thumbnail image.

Figure 9:
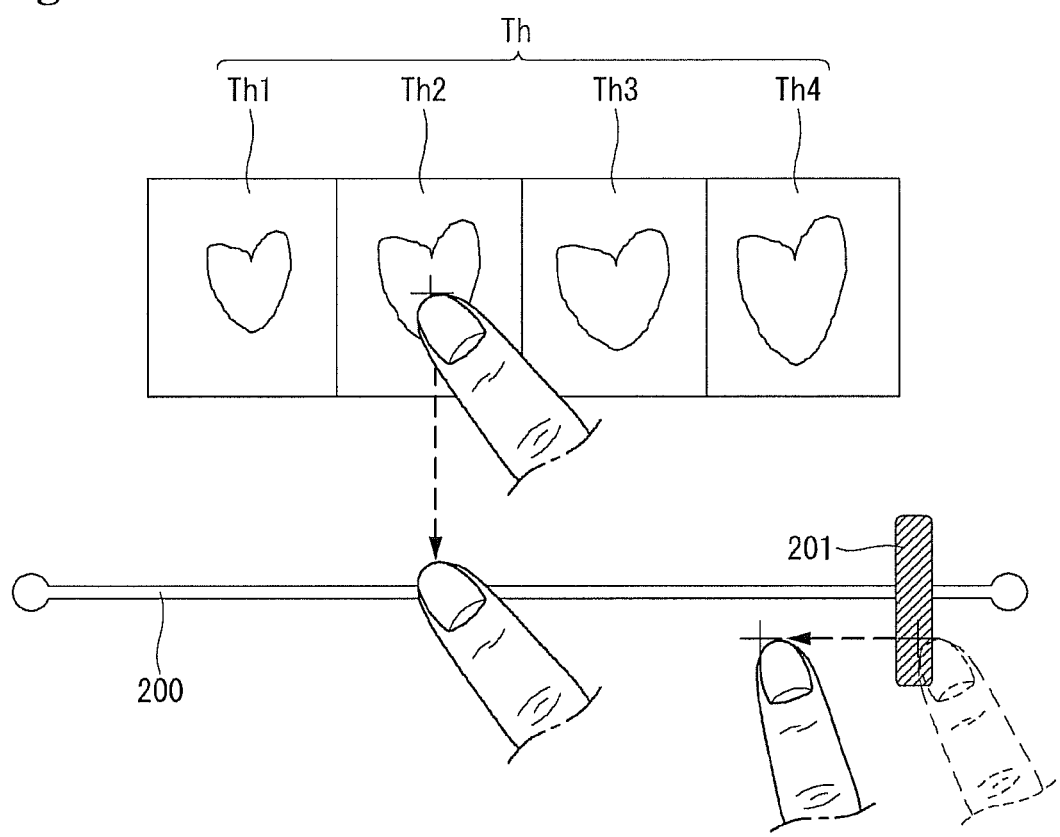

For example, referring to FIG. 9, when receiving a drag input by which the second thumbnail image Th2 of the thumbnail image group Th is moved to the bar 200, the controller 180 sets the bar 200 as a bar for controlling the editing of the contour of the second object OB2. That is, the controller 180 may map information related to the contour of the second object OB2 to the bar 200 in response to the drag input. Accordingly, the bar 200 may control the undo function for the contours of all the objects displayed on the touch screen 151 in this manner.

Figure 10:
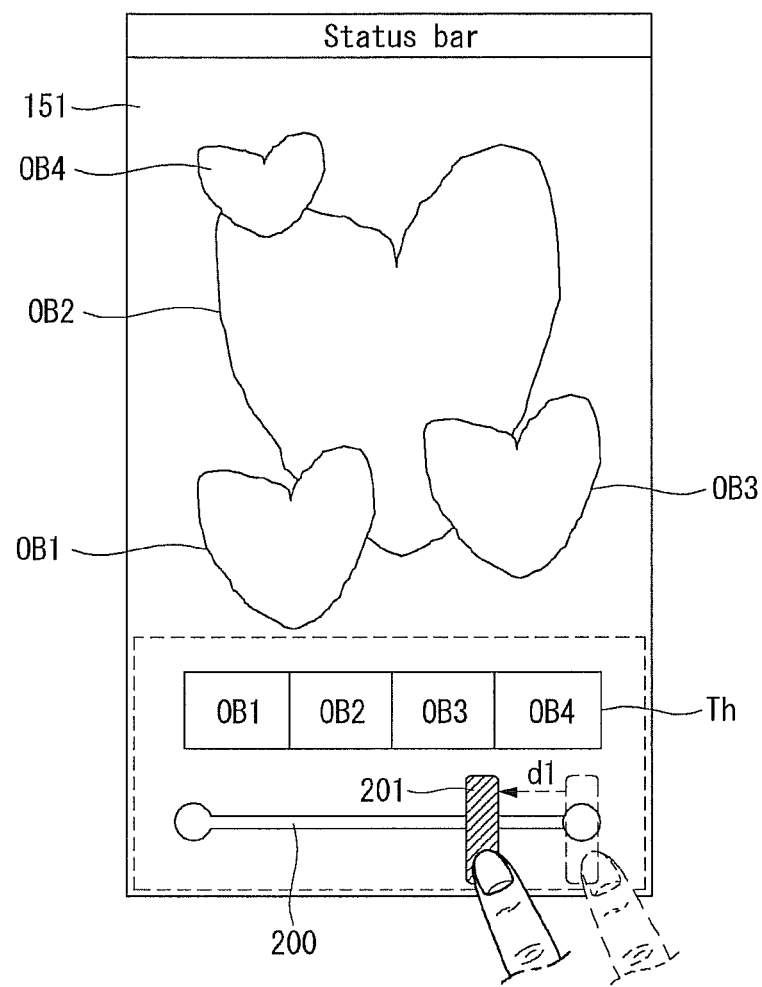
Figure 11:
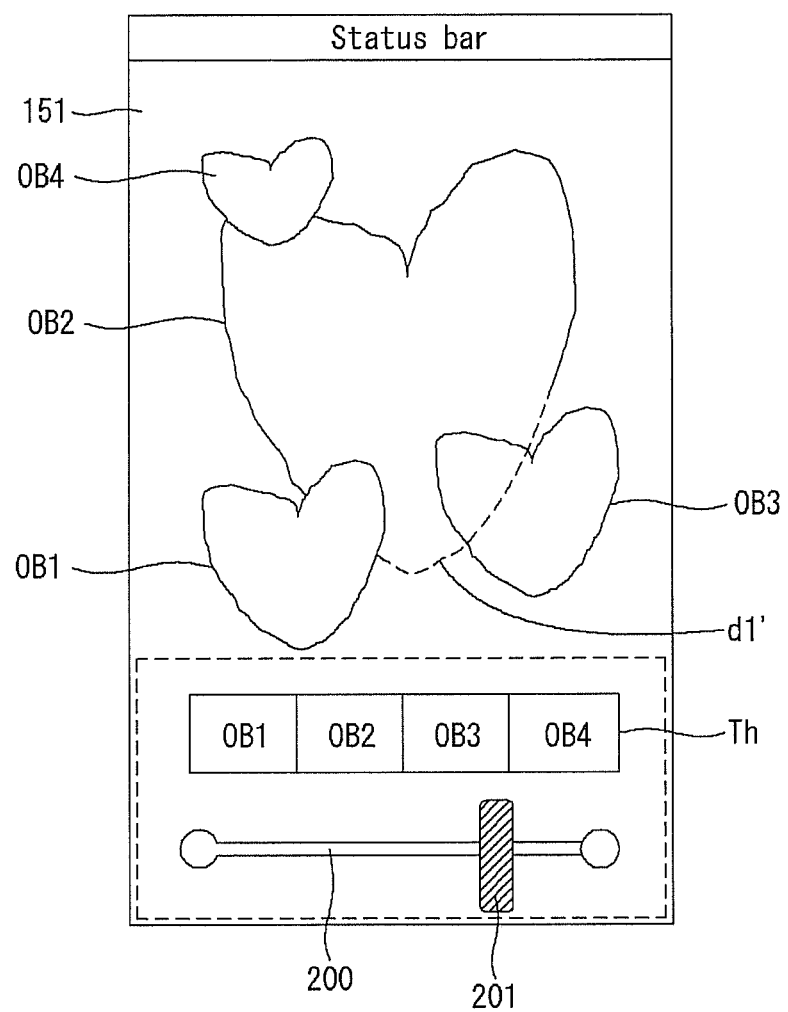

Referring to FIGS. 10 and 11, when receiving an input by which the handle 201 of the bar 200 is moved to the left by a specific length d1, the controller 180 may delete a section of the contour of the second object OB2 by executing the undo function on the section of the contour of the second object OB2 having a length d1' corresponding to the length d1. At this time, the controller 180 does not edit the contour of the remaining objects OB1, OB3 and OB4. That is, the controller 180 performs a contour edit only an object (in this case, OB1) associated with the bar 200.

Figure 12:
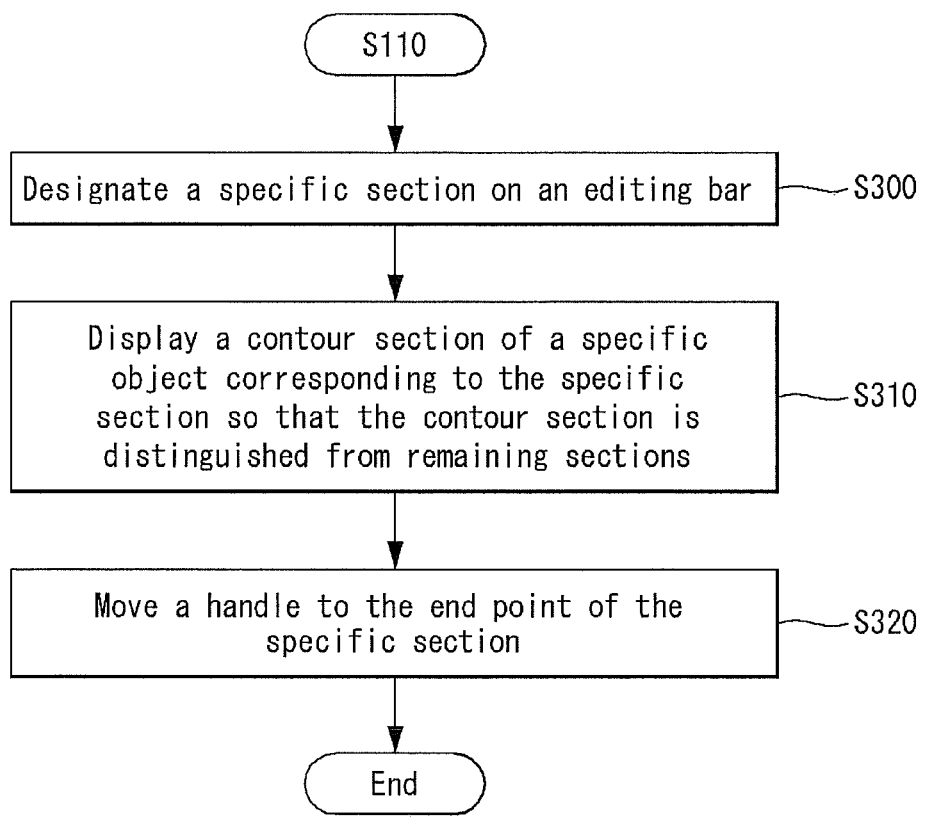
FIG. 12 is a flowchart of a method of controlling the mobile terminal in accordance with another embodiment as broadly described herein.

An operation in which a user selects a specific section of the bar and the undo function is performed on the selected section is described in more detail below. FIG. 12 is a flowchart of a method of controlling the mobile terminal in accordance with another embodiment, and FIGS. 13 to 17 illustrate application of the method shown in FIG. 12. Furthermore, the embodiment shown in FIG. 12 may be executed based on the first embodiment or the second embodiment or both.

Referring to FIG. 12, the controller 180 may designate a specific section on the bar 200 at step S300, and then display a section of the contour of a specific object corresponding to the specific section so that the displayed section is distinguished from other sections of the contour at step S310. The controller 180 may move the handle 201 to the end point of the specific section at step S320.

For example, when entering the edit mode, the handle 201 may be positioned at the end point 220 of the bar 200. That is, as previously described, the end point 220 of the bar 200 corresponds to the end point EP of a contour that forms an object. Accordingly, when the handle 201 is moved to the left, the undo function may be executed in reverse order. If a start position of the handle 201 is an intermediate, or middle, point of the bar 200, and not the end point of the bar 200, a section of the contour of the object on which the undo function is performed may be changed.

Figure 13:
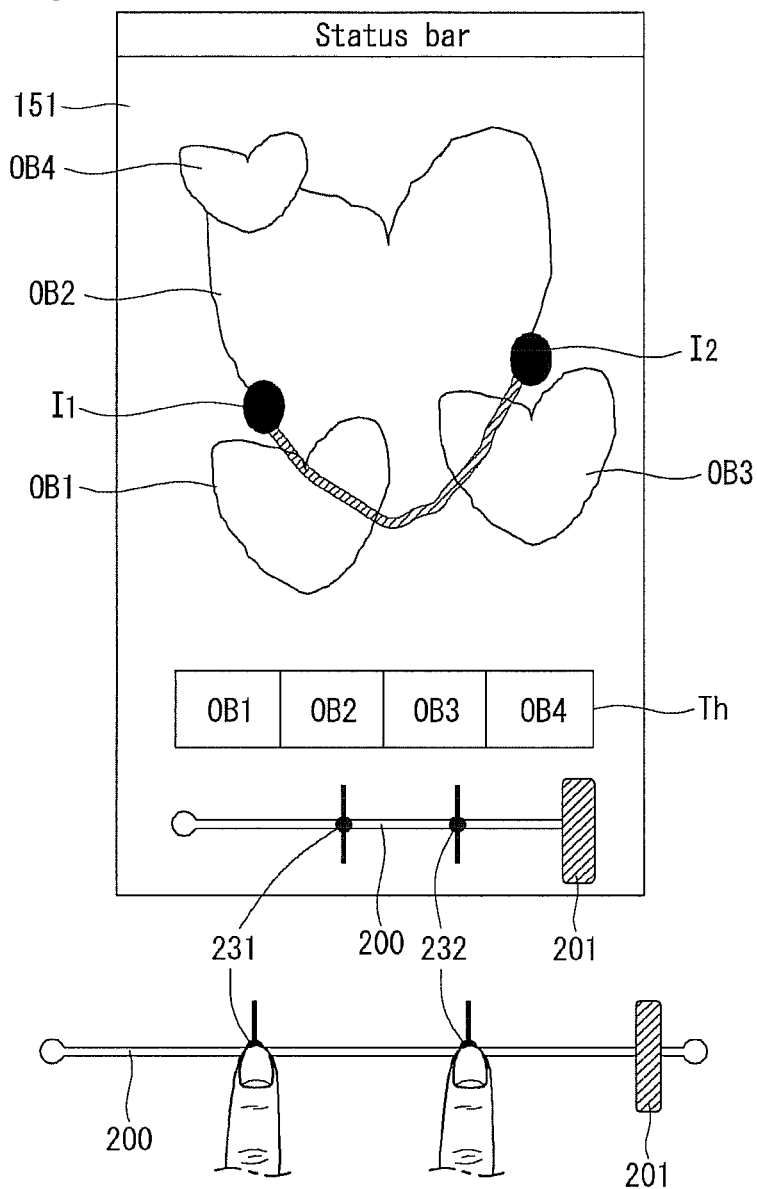
FIGS. 13 to 17 illustrate the method of controlling the mobile terminal shown in FIG. 12, in accordance with embodiments as broadly described herein.

For example, referring to FIG. 13, when receiving a touch input in which a specific section on the bar 200 is designated by two points 231 and 232, the controller 180 moves the handle 201 from the end point of the bar 200 to an end point 232 of the designated specific section so that the undo function may be executed on a section I1-I2 of the contour of the second object OB2.

Figure 14:
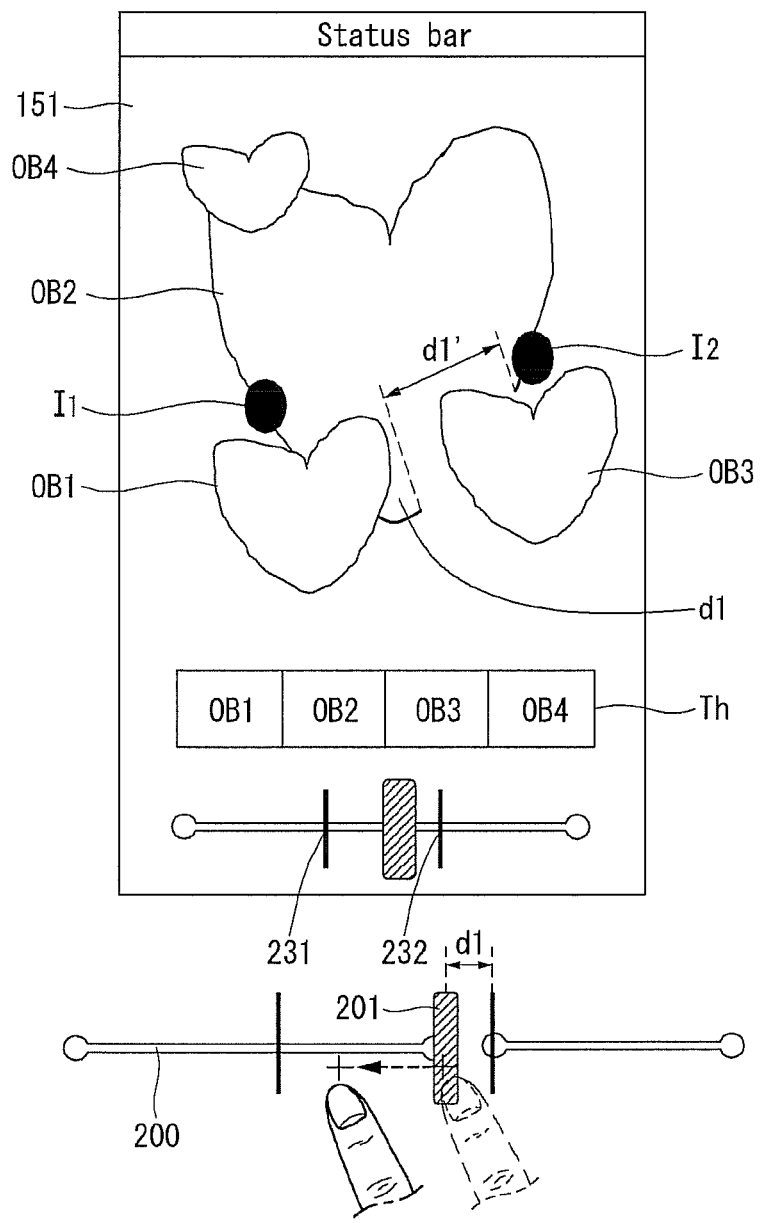

Thereafter, referring to FIG. 14, when receiving a drag input in which the handle 201 placed at the end point 232 of the specified section is moved to the left by a length d1, the controller 180 may execute the undo function on the second object OB2 along a length d1' of the contour corresponding to the length d1.

Figure 15:
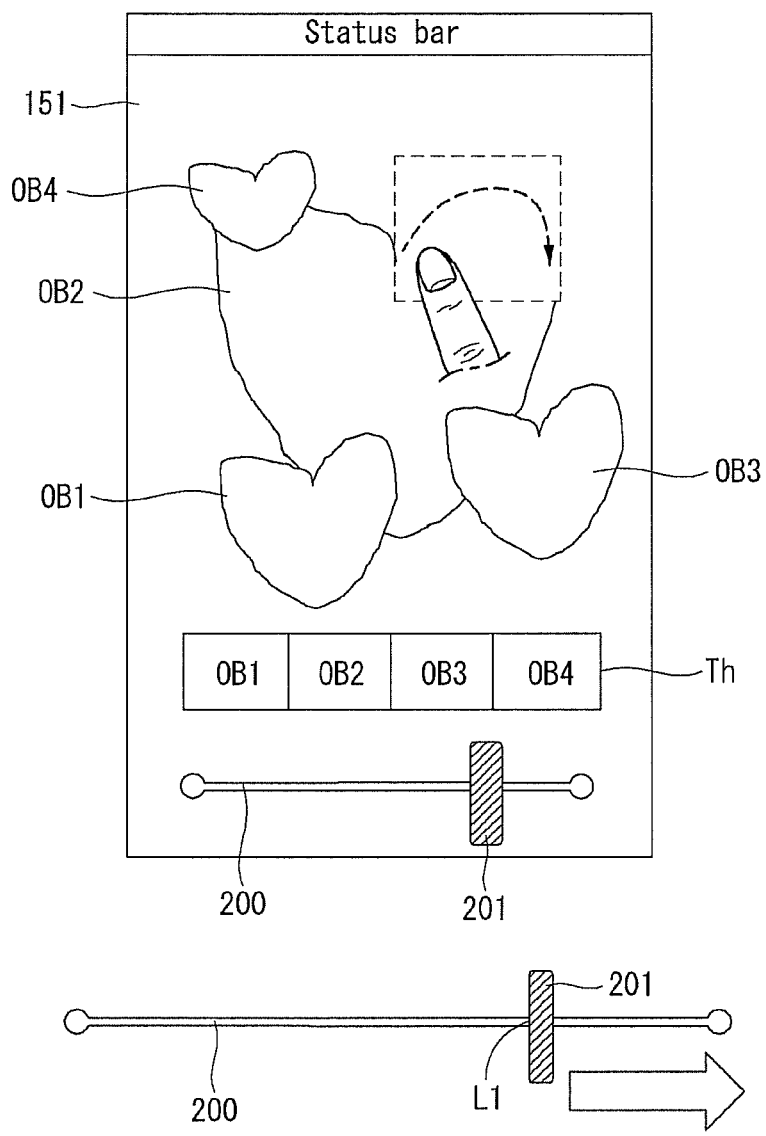
Figure 16:
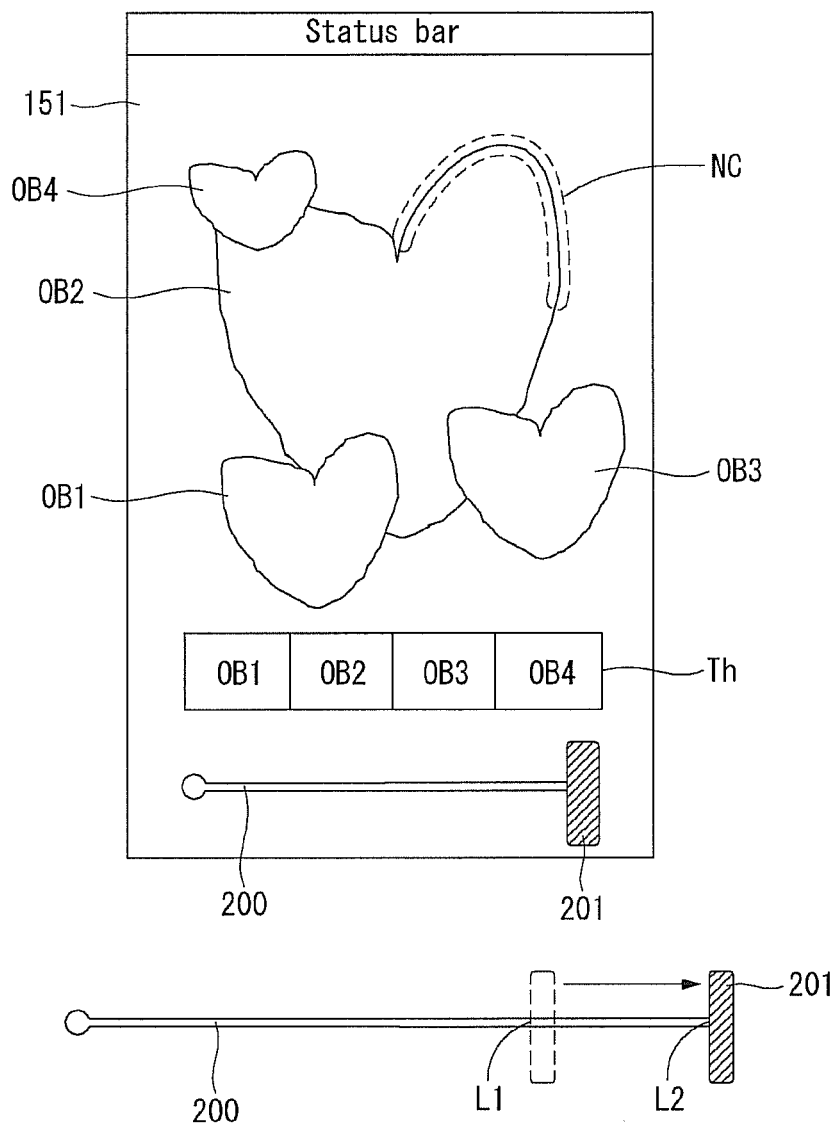
Figure 17:
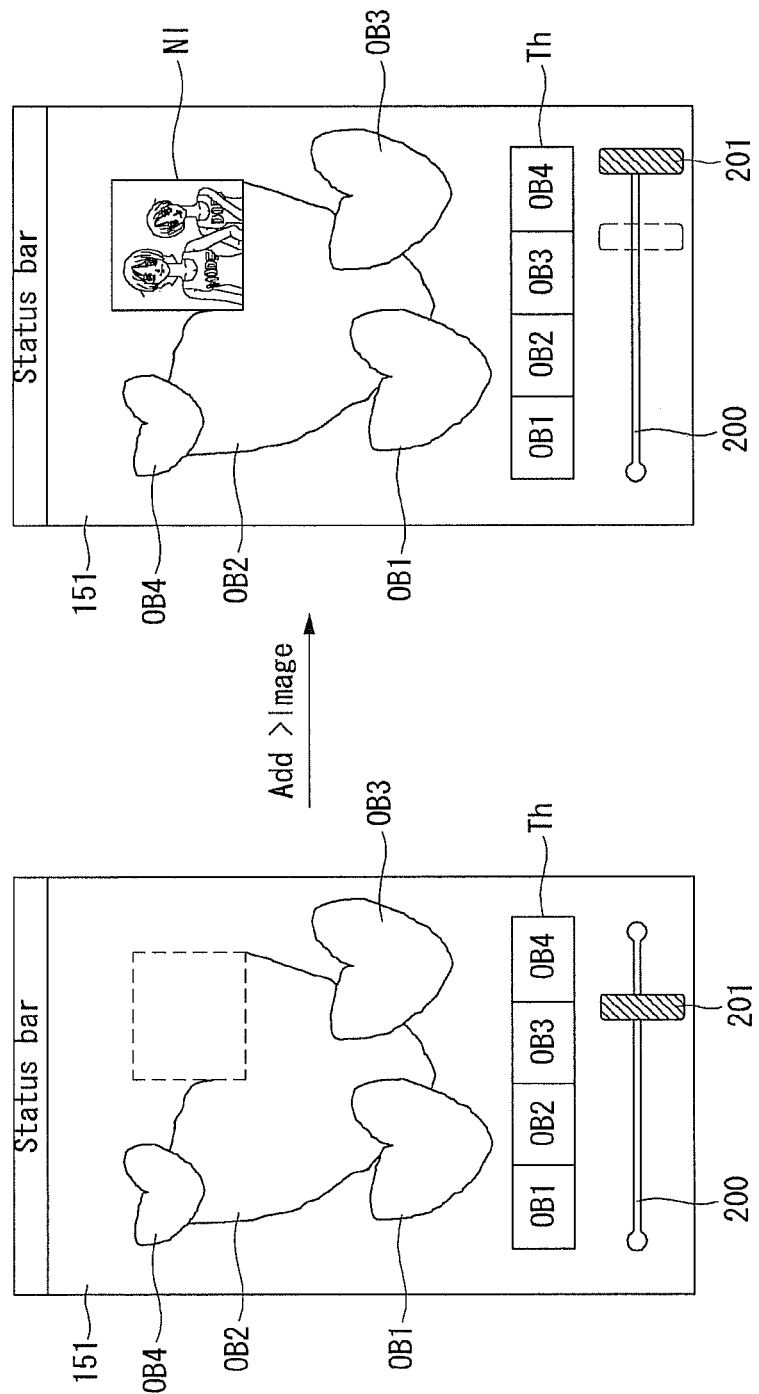

Referring to FIGS. 15 and 16, in the state in which the undo function has been executed on a specific section of the second object OB2, the controller 180 may add a new contour NC to the specific section on which the undo function has been performed in response to a user's handwriting input. When the new contour NC is added to the second object OB2 and combined therewith, the controller 180 may move the handle 201 from L1 to L2.

It is noted that a newly inserted contour is not limited to the object having the contour described above. For example, referring to FIG. 17, an image NI stored in the memory 160 of the mobile terminal 100 may be inserted into the section on which the undo function has been performed. Furthermore, the controller 180 may incorporate the insertion of the image NI into the bar 200 by moving the handle 201 to the right.

An embodiment in which a contour is conveniently edited when a plurality of sequentially generated objects has a region in which some of the objects overlap with each other is described below.

Figure 18:
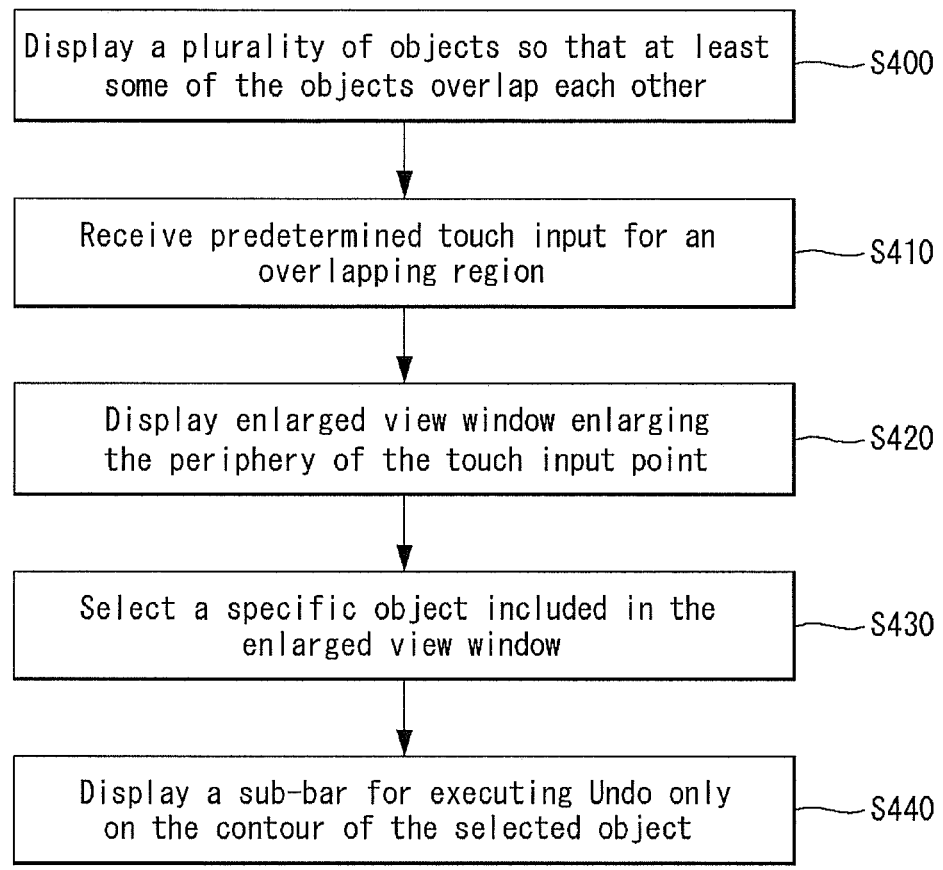
FIG. 18 is a flowchart of a method of controlling the mobile terminal in accordance with another embodiment as broadly described herein.

FIG. 18 is a flowchart of a method of controlling the mobile terminal in accordance with another embodiment, and FIGS. 19 to 26 illustrate application of the method shown in FIG. 18. This embodiment may also be executed based on at least one of the first to third embodiments.

Referring to FIG. 18, the controller 180 may display a plurality of objects on the touch screen 151 so that at least some of the plurality of objects overlap with each other at step S400. When receiving a predetermined touch input for the overlapping region at step S410, the controller 180 may display an enlarged view window enlarging the peripheries of a touch point on the touch screen 151 at step S420.

When receiving an input by which a specific object included in the enlarged view window is selected at step S430, the controller 180 may display a sub-bar for executing the undo function only on the contour of the selected object on the touch screen 151 at step S440.

Figure 19:
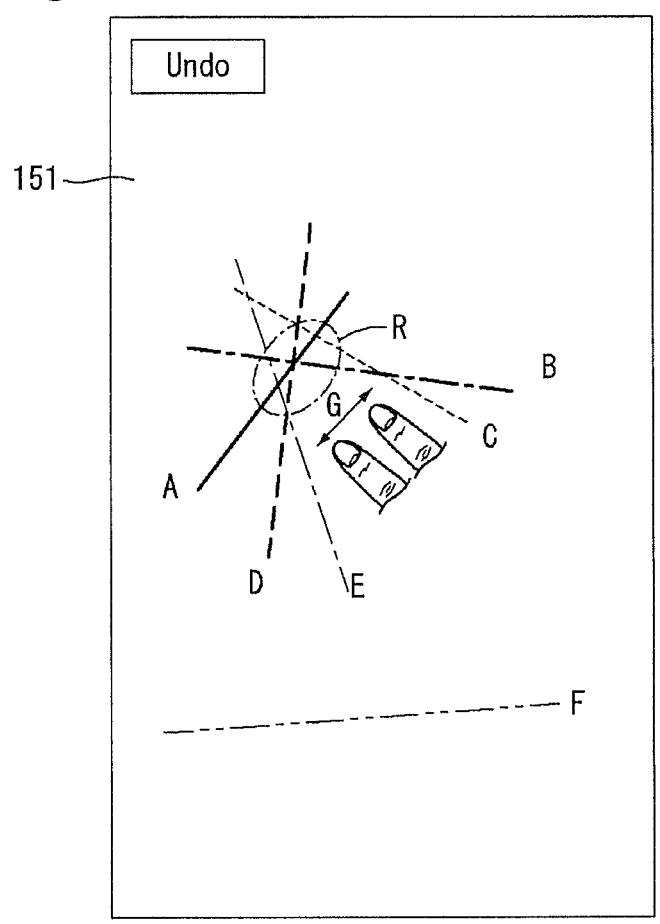

For example, referring to FIG. 19, the controller 180 displays a plurality of objects A, B, C, D, E and F on the touch screen 151, where at least some (e.g., A, B, C, D and E, but not F) of the plurality of objects A, B, C, D, E and F overlap each other. Here, if it is sought to, for example, delete the contours of all of the objects other than the object A, from among the objects near the overlap region, an operation of deleting the contours of the remaining objects may be performed in a simpler way in accordance with a method of controlling the mobile terminal in accordance with an embodiment as broadly described herein.

Figure 20:
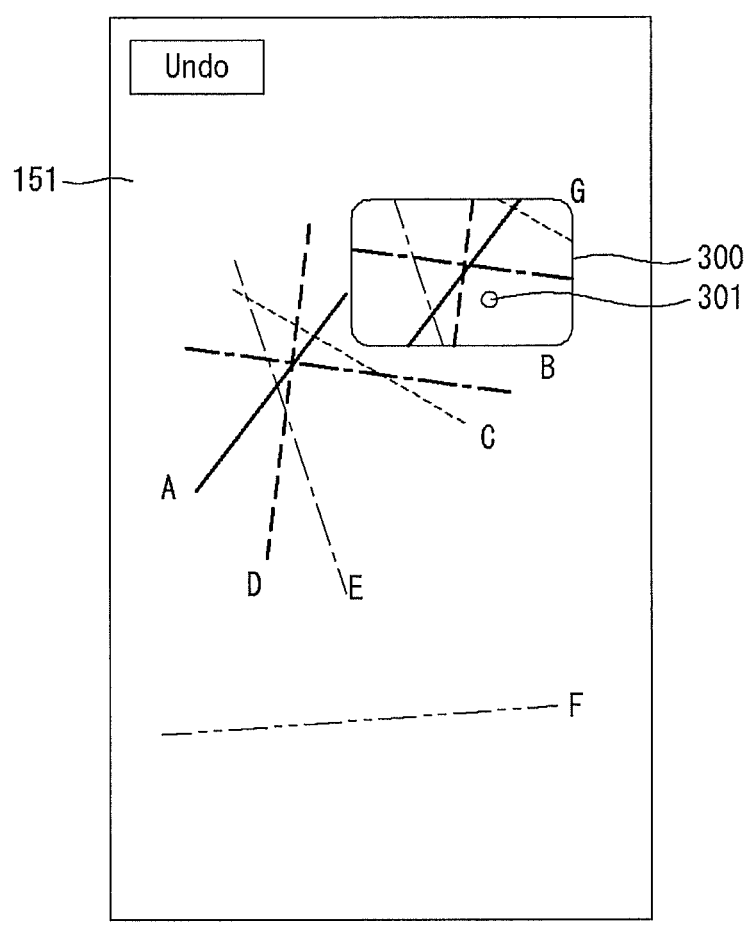

When receiving a predetermined touch input for the region G to be detected, the controller 180 may display the enlarged view window 300, corresponding to the region G, near the region G as in a bar shown in FIG. 20.

If a plurality of objects has a region in which some of the plurality of objects overlap each other and the overlapped region is displayed on the touch screen 151 having limited size, it may not be easy to execute the undo function by way of a user's touch input for some sections of a contour displayed in the overlapped region. For example, it may be difficult to select the contour of an object to be deleted by a user because the contour is covered by a user's finger. If the enlarged view window 300 is used, however, the undo function may be more easily executed on the contour of the object covered with a user's finger.

The predetermined touch input may include a touch input by which the region G is rubbed.

The enlarged view window 300 may enlarge and display each of a plurality of objects included in the region G. Furthermore, the enlarged view window 300 may include a pointer 301 for selecting a plurality of enlarged objects.

Figure 21:
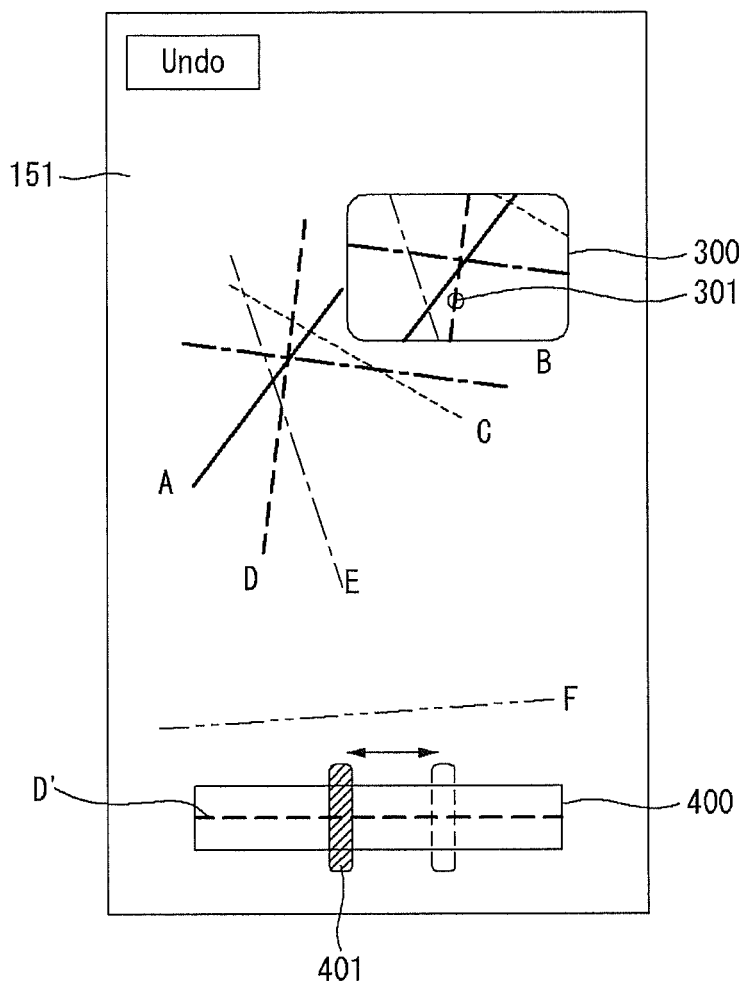

Referring to FIG. 21, the controller 180 may display a bar 400 for executing the undo function on at least some sections of the contour of an object indicated by the pointer 301 on the touch screen 151. The bar 400 may include a handle 401. The handle 401 may delete the contour of a specific object while moving left and right along the bar 400.

Referring to FIG. 21, if the pointer 301 indicates the object D so that the object D is selected, the controller 180 may set the bar 400 as a bar for controlling the undo function on the contour of the object D by mapping information related to the contour of the object D to the bar 400. The controller 180 may also display an image D', corresponding to the object D, in the bar 400 to indicate the object D mapped to the bar 400. The controller 180 may execute the undo function on at least some sections of the contours of all objects near the region G using the method described with reference to FIG. 21.

Figure 22:
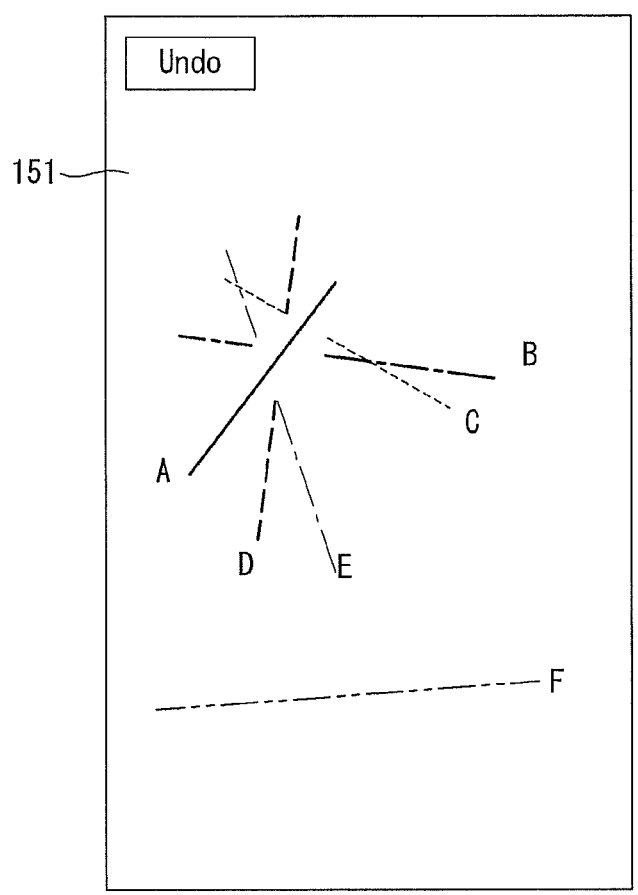

Referring to FIG. 22, the controller 180 may also execute the undo function on contours included in the region G, from among the remaining objects B, C, D and E, excluding the object A, in accordance with the aforementioned method. As a result, only the contour of the object A is present in the region G, and the contours of the remaining objects B, C, D and E appear deleted.

In accordance with an embodiment as broadly described herein, the controller 180 may execute the undo function on a plurality of objects with one bar for controlling the undo function for at least some section of a specific object. An embodiment in which N objects are edited at the same time is described below with reference to FIGS. 23 to 26.

Referring to FIG. 23, when entering a mode in which the undo function is enabled in the state in which a plurality of objects A, B, C, D, E and F are displayed on the touch screen 151, the controller 180 may also display a bar 500 for controlling the undo function for the contours of the respective objects on the touch screen 151. The bar 500 may be partitioned into a plurality of regions and displayed by taking the order of the plurality of generated objects and the number of objects into consideration.

For example, if the plurality of objects A, B, C, D, E and F have been sequentially generated, the bar 500 may be partitioned into six regions and pieces of information about the contours of the respective objects A, B, C, D, E and F can be assigned to the six regions. Furthermore, the bar 500 may include a handle 510, and the controller 180 may execute the undo function on the contours of the objects A, B, C, D, E and F by controlling movement of the handle 510 as in the aforementioned embodiments.

Referring to FIG. 24, when the handle 510 moves along the bar 500 from the region F to the middle point of the region C, the controller 180 may delete the contours (i.e., a section from an end point of the contours F, E, D and C to the middle point of the contour C) of objects through which the handle 510 passes. Accordingly, an object displayed on the touch screen 151 may include some sections of the objects A, B and C.

Referring to FIG. 25, when receiving a soft key input by which the undo function is executed in the state in which a first handle 510 has been displayed, the controller 180 may display a second handle 520 in a specific location on the bar 500. The first handle 510 and the second handle 520 shown in FIG. 25 are placed at locations where the undo function may be executed on the respective objects C and D. It is to be noted that the location of each of the first and the second handles may be changed by a user's manipulation.

Referring to FIG. 26, when receiving an input 510' by which the first handle 510 shown in FIG. 25 is moved to the left by a distance d3 and an input 520' by which the second handle 520 shown in FIG. 25 is moved to the left by a distance d4 at the same time, the controller 180 may execute the undo function on the contour of the object C by a distance d3' and the undo function on the contour of the object D by a distance d4'.

Figure 27:
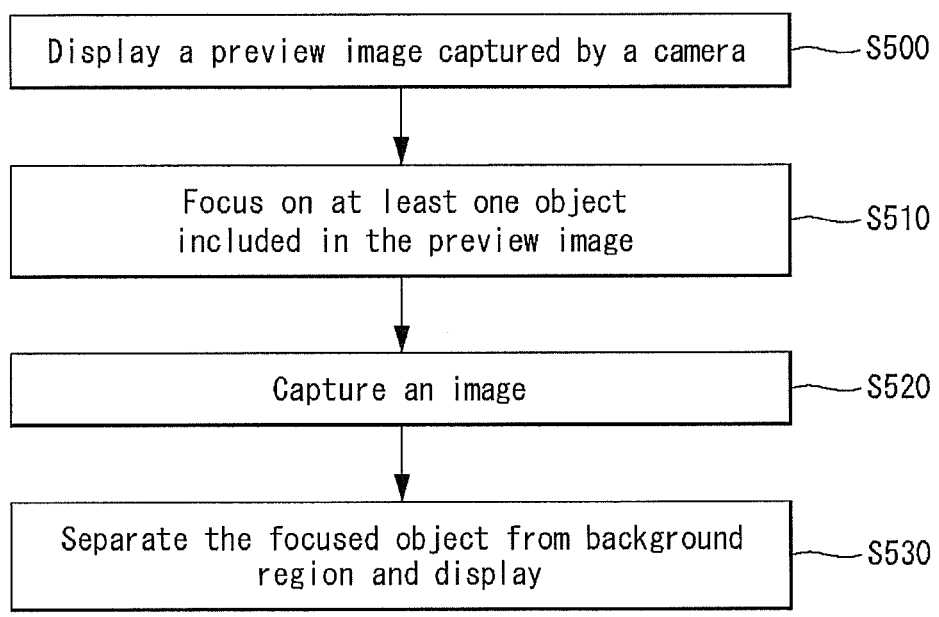
FIG. 27 is a flowchart of a method of controlling the mobile terminal in accordance with another embodiment as broadly described herein.
Figure 28:
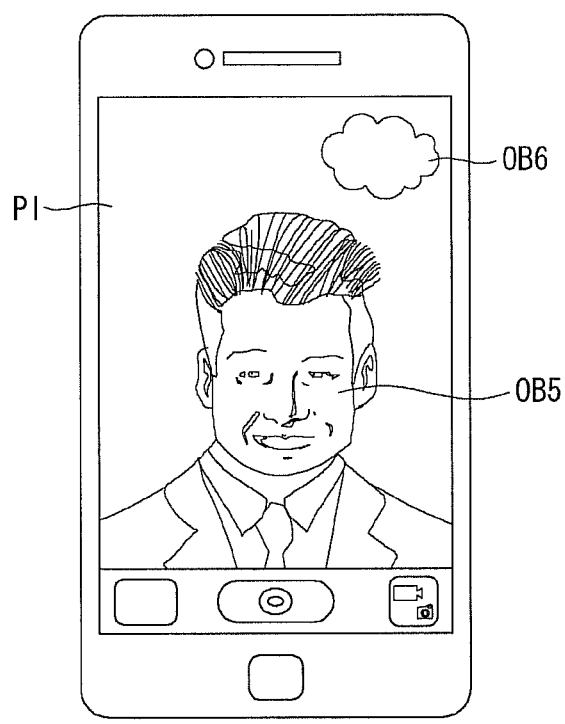

FIG. 27 is a flowchart illustrating a method of controlling the mobile terminal in accordance with another embodiment as broadly described herein, and FIGS. 28 to 29 illustrate application of the method shown in FIG. 27.

Referring to FIG. 27, the controller 180 may display a preview image, captured by the camera 121, on the touch screen 151 at step S500. The controller 180 may perform focusing on at least one object included in the preview image at step S510. When receiving a touch input for a specific object included in the preview image, the controller 180 may focus the specific object. The controller 180 may also display a focusing guide in the object. When an image including the focused object is captured at step S520, the controller 180 may separate the focused object from a background region and store the focused object and the background region at step S530. If the focused object is a character, the background region may refer to remaining regions other than the character.

Referring to FIG. 28, a preview image PI may include, for example, a character object OB5 and another object OB6 included in the remaining background region.

Referring to FIG. 29, when receiving a touch input for the character object OB5 in the preview image PI, the controller 180 may focus on the character object OB5, and may recognize the entire focused character object OB5. Thereafter, when receiving an input for an image capturing function, the controller 180 may store the captured image BI. The controller 180 may separate the focused character object OB5 from the background region and store them. Furthermore, when receiving an input by which an unwanted object OB6 included in the background region of the image BI is selected, the controller 180 may delete the unwanted object OB6 from the background region. The controller 180 may then generate a new image I including the focused object OB5 and the background region from which the unwanted object OB6 has been removed.

Accordingly, a user may simply delete an unnecessary object included in a background region by selecting only a desired object in a preview image and performing focusing on the selected object.

The aforementioned embodiment has been described on the assumption that one object OB6 is included in the background region, but embodiments are not limited thereto. For example, the background region may include a plurality of objects, and the plurality of objects may at least partially overlap.

In this case, as described above in connection with the aforementioned embodiments, the controller 180 may execute the undo function on the plurality of objects included in the background region more conveniently by displaying the bar for executing the undo function on at least some section of the contour of a specific object, included in the background region, on the touch screen 151 and controlling the handle of the bar.

Furthermore, by applying the enlarged view window to a specific object included in the background region in order to execute the undo function on the specific object, the controller 180 may execute the undo function on the specific object more simply.

The methods of controlling the mobile terminal as embodied and broadly described herein may be recorded on a computer-readable recording medium in the form of a program for executing the control methods in a computer.

The methods of controlling the mobile terminal in accordance with embodiments as broadly described herein may be executed through software. When the methods are executed in software, the elements may be code segments that execute necessary tasks. The program or code segments may be stored in a processor-readable medium or may be transmitted through a transfer medium or a computer data signal combined with carriers over a communication network.

The computer-readable recording medium may include all kinds of recording devices on which data readable by a computer system is recorded. The computer-readable recording medium may include, for example, ROM, RAM, CD-ROM, DVD±ROM, DVD-RAM, magnetic tapes, floppy disks, hard disks, and optical data storages. Codes distributed over computer apparatuses coupled together over a network and readable by computers in a distributed manner may be stored in the computer-readable recording medium and executed.

In accordance with embodiments as broadly described herein, by providing the bar for executing the undo function on at least some section of the contour of a specific object, the undo function may be executed on at least part of an object having a specific contour more conveniently.

Furthermore, if a plurality of displayed objects overlap each other, the undo function may be executed on at least some section of the contour of a specific object more conveniently.

Furthermore, when a specific image including a desired object and a background region is captured by a camera, the desired object may be separated from the background region, including any unwanted objects and the separated desired object and background region may be stored. Accordingly, a new image including only the desired object may be obtained by removing the unwanted object(s) from the background region and composing the desired object and the background region from which the unwanted object(s) have been removed.

A mobile terminal and a method of controlling a mobile terminal are provided that are capable of executing an undo function on at least part of a contour forming an object more conveniently.

A mobile terminal and associated control method are provided, including a user interface capable of editing at least part of a specific object of a plurality of objects at least some of which overlap with each other more conveniently and precisely.

A mobile terminal as embodied and broadly described herein may include a touch screen and a controller configured to generate a plurality of objects comprising a specific contour, display the plurality of objects in the touch screen, and display a bar for controlling an undo function on at least some section of a contour forming a specific object, from among the plurality of objects.

The plurality of objects may be sequentially generated and displayed in the touch screen.

At least some of the plurality of objects may be overlapped with each other and displayed in the touch screen.

The bar may include a handler controlled so that the handler executes the undo function when moving in a specific direction, the start point of the bar may correspond to the start point of the contour forming the specific object, and the end point of the bar may correspond to the end point of the contour.

The controller may execute the undo function when receiving an input by which the handler is moved in a specific direction on the bar.

When receiving an input by which the handler is moved in a first direction on the bar, the controller may execute the undo function by a section of the contour corresponding to a length in which the handler has moved in the specific object. When receiving an input by which the handler is moved in a direction opposite to the first direction after executing the undo function, the controller may execute a redo function on the section of the contour on which the undo function has been executed.

The controller may display thumbnail images, corresponding to the respective objects, in the touch screen, and the thumbnail images may be arranged and displayed in order of the generated objects.

When receiving a drag input by which any one of the thumbnail images is selected and moved to the bar, the controller may set the bar as a bar for controlling the undo function for the contour of an object corresponding to the selected thumbnail image.

When receiving a touch input by which a specific section on the bar may be designated, the controller may display a specific section of the contour of the specific object corresponding to the specific section on the bar so that the specific section of the contour is distinguished from remaining sections of the contour of the specific object.

The controller may display the handler at the end point of the specific section.

When receiving a touch input by which a new contour is inserted into the at least some section after executing the undo function on the at least some section, the controller may control a location of the handler on the bar by incorporating the new contour into the location of the handler.

The new contour may include at least one of a handwriting input touch contour and an image stored in the mobile terminal.

When receiving a predetermined touch input for a region in which the plurality of objects overlaps with each other, the controller displays an enlargement view window for enlarging and displaying peripheries of the touch inputted point near the touch inputted point.

When receiving an input by which any one of the plurality of objects displayed in the enlargement view window is selected, the controller may display a sub-bar for executing the undo function on only the contour of the selected object in the touch screen, and the sub-bar may activate and display only the selected object.

A mobile terminal in accordance with another embodiment may include a camera, a memory, a touch screen, and a controller configured to display a preview image captured by the camera in the touch screen, perform focusing on at least one object included in the preview image, separate the focused object from a background region other than the focused object when capturing an image, and separately store the focused object and background region in the memory.

In accordance with yet another embodiment as broadly described herein, a method of controlling a mobile terminal may include sequentially generating a plurality of objects having a specific contour and displaying the plurality of objects in a touch screen, entering edition mode for editing at least one of the plurality of objects in response to a predetermined input, and displaying a bar for controlling an undo function for at least some section of a contour forming a specific object of the plurality of objects in the touch screen.

In accordance with yet another embodiment, a method of controlling a mobile terminal may include displaying a preview image captured by a camera in a touch screen, performing focusing on at least one object included in the preview image, and separating the focused object from a background region other than the focused object and separately storing the focused object and the background region in a memory, when capturing an image.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising
a touch screen configured to receive touch inputs corresponding to a plurality of objects each having a specific contour; and
a controller configured to control the touch screen to display the plurality of objects based on the touch inputs in a first area, and to display an editing interface for performing at least one editing function including at least one of an undo function and a redo function on a section of a contour of a selected object of the plurality of objects in a second area, wherein the editing interface includes:
a start point corresponding to a start point of the contour forming the selected object;
an end point corresponding to an end point of the contour;
a bar that extends between the start and end points, the bar corresponding to the contour; and
a handle that moves along the bar according to a touch input provided thereto wherein the controller is further configured to:
delete a certain section of the contour, a length of the certain section corresponding to a distance the handle has moved in a first direction when the handle is moved in the first direction along the bar; and
restore the certain section of the contour deleted by the undo function when the handle is moved in a second direction along the bar after the undo function, the second direction being opposite the first direction.

2. The mobile terminal of claim 1, wherein movement of the handle along the bar designates a certain section of the bar corresponding to the certain section of the contour, wherein the at least one editing function is performed on the certain section of the contour.

3. The mobile terminal of claim 1, wherein, when a new contour is inserted into the certain section deleted by the undo function, a location of the handle on the bar is adjusted to incorporate the new contour.

4. The mobile terminal of claim 3, wherein the new contour includes at least one of a handwriting input or a previously stored image.

5. The mobile terminal of claim 4, wherein, in response to a touch input at an area where at least some of the plurality of objects overlap, an enlarged view window of the overlap area is displayed.

6. The mobile terminal of claim 5, wherein, in response to a touch input applied to one of the plurality of objects displayed in the enlarged view window, a sub-bar that executes the undo function on only a contour of the selected object is displayed to activate and display only the selected object.

7. The mobile terminal of claim 6, wherein the selected object is displayed as a line that extends along the bar.

8. The mobile terminal of claim 1, further including a plurality of thumbnail images corresponding to the plurality of objects, the plurality of thumbnail images being sequentially displayed on the touch screen in the order in which the plurality of objects are generated.

9. The mobile terminal of claim 8, wherein the at least one editing function is performed on an object corresponding to a selected thumbnail image that has been dragged to the editing interface by a drag input.

10. The mobile terminal of claim 1, wherein at least some of the plurality of objects overlap each other when displayed on the touch screen.

11. The mobile terminal of claim 10, wherein, in response to a touch input that designates a specific section of the bar, a specific section of the contour of a selected object corresponding to the specific section of the bar is displayed differently from remaining sections of the contour.

12. A mobile terminal, comprising:
a camera;
a memory;
a touch screen; and
a controller configured to control the camera, memory and touch screen to display a preview image captured by the camera in a first area on the touch screen, focus on at least one primary object included in the preview image, separate the at least one primary object from a background region, separately store the at least one primary object and the background region in the memory, and display an editing interface to perform at least one editing function including at least one of an undo function or a redo function on a section of a contour of at least one secondary object included in the background region in a second area, wherein the editing interface includes:
a start point corresponding to a start point of the contour forming the selected object;
an end point corresponding to an end point of the contour;
a bar extending between the start and end points, the bar corresponding to the contour; and
a handle that moves along the bar according to a touch input provided thereto, wherein the controller is further configured to:
delete a certain section of the contour, a length of the certain section corresponding to a distance the handle has moved in a first direction when the handle is moved in the first direction along the bar; and
restore the certain section of the contour deleted by the undo function when the handle is moved in a second direction along the bar after the undo function, the second direction being opposite the first direction.

13. The mobile terminal of claim 12, wherein, in an editing mode, the at least one primary object and the background region from which the at least one secondary object has been deleted are stored as a composite image in the memory.

14. A method of controlling a mobile terminal, comprising:
sequentially generating a plurality of objects each having a specific contour and displaying the plurality of objects in a first area on a touch screen;
entering an editing mode for editing at least one of the plurality of objects in response to a predetermined input; and
displaying an editing bar for controlling at least one editing function including at least an undo function for a section of a contour of a selected object of the plurality of objects displayed in a second area on the touch screen, wherein the editing interface includes:
a start point corresponding to a start point of the contour forming the selected object;
an end point corresponding to an end point of the contour;
a bar extending between the start and end points, the bar corresponding to the contour; and
a handle that moves along the bar according to a touch input provided thereto, wherein the controller is further configured to:
delete a certain section of the contour, a length of the certain section corresponding to a distance the handle has moved in a first direction when the handle is moved in the first direction along the bar; and
restore the certain section of the contour deleted by the undo function when the handle is moved in a second direction along the bar after the undo function, the second direction being opposite the first direction.

15. A method of controlling a mobile terminal, comprising:
displaying a preview image captured by a camera in a first area on a touch screen;
focusing on at least one object included in the preview image;
separating the at least one object from a background region excluding the at least one object and separately storing the at least one object and the background region in a memory; and
displaying an editing interface to perform at least one editing function including at least one of an undo function and a redo function on a section of a contour of at least one secondary object included in the background region in a second area, wherein the editing interface includes:
a start point corresponding to a start point of the contour forming the selected object;
an end point corresponding to an end point of the contour;
a bar extending between the start and end points, the bar corresponding to the contour; and
a handle that moves along the bar according to a touch input provided thereto, wherein the controller is further configured to:
delete a certain section of the contour, a length of the certain section corresponding to a distance the handle has moved in a first direction when the handle is moved in the first direction along the bar; and
restore the certain section of the contour deleted by the undo function when the handle is moved in a second direction along the bar after the undo function, the second direction being opposite the first direction.

* * * * *